United States Patent
Graif et al.

(10) Patent No.: US 11,010,327 B2
(45) Date of Patent: May 18, 2021

(54) I3C POINT TO POINT

(71) Applicant: QUALCOMM Incorporated, San Diego, CA (US)

(72) Inventors: Sharon Graif, Zichron Yakov (IL); Meital Zangvil, Haifa (IL); Lior Amarilio, Yokneam (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/519,531

(22) Filed: Jul. 23, 2019

(65) Prior Publication Data

US 2021/0026796 A1     Jan. 28, 2021

(51) Int. Cl.
*G06F 13/42*     (2006.01)
*G06F 13/24*     (2006.01)

(52) U.S. Cl.
CPC .......... *G06F 13/4282* (2013.01); *G06F 13/24* (2013.01)

(58) Field of Classification Search
None
See application file for complete search history.

(56) References Cited

U.S. PATENT DOCUMENTS

| | | | | |
|---|---|---|---|---|
| 6,735,655 B1* | 5/2004 | Chilton | ................... | G06F 13/24 710/262 |
| 2012/0036298 A1* | 2/2012 | Lais | ........................ | G06F 13/24 710/260 |
| 2017/0104733 A1* | 4/2017 | Thanigasalam | ..... | G06F 13/1673 |
| 2017/0132163 A1* | 5/2017 | Aslot | ...................... | G06F 12/08 |
| 2017/0286358 A1* | 10/2017 | Srivastava | .......... | G06F 13/4291 |
| 2018/0189221 A1* | 7/2018 | Morning-Smith | .......................... | G06F 13/4282 |
| 2018/0260339 A1* | 9/2018 | Shallal | .................. | G06F 9/4401 |
| 2019/0042281 A1* | 2/2019 | Raghav | ............... | G06F 9/44505 |
| 2019/0042348 A1* | 2/2019 | Krithivas | .............. | G06F 11/079 |
| 2019/0042526 A1* | 2/2019 | Srivastava | .......... | G06F 13/4291 |
| 2019/0121765 A1* | 4/2019 | Srivastava | ............. | H04L 47/30 |
| 2019/0171588 A1* | 6/2019 | Mishra | .................. | G06F 13/105 |
| 2019/0227753 A1* | 7/2019 | Zhu | ....................... | G06F 3/0604 |
| 2019/0286605 A1* | 9/2019 | Harriman | ............ | G06F 13/4226 |
| 2019/0349426 A1* | 11/2019 | Smith | ..................... | H04W 4/08 |
| 2019/0377702 A1* | 12/2019 | Pitigoi-Aron | ....... | G06F 13/4291 |

* cited by examiner

*Primary Examiner* — Henry Tsai
*Assistant Examiner* — Aurangzeb Hassan
(74) *Attorney, Agent, or Firm* — Loza & Loza LLP

(57) ABSTRACT

Systems, methods, and apparatus are described. A method for data communication performed at a master device includes configuring a serial interface for a point-to-point mode of operation, transmitting a first two-bit command through the serial interface, the two-bit command including a one-bit address and a read/write bit, and initiating a transaction through the serial interface. The transaction may be identified by the two-bit command and is conducted in accordance with an I3C protocol. The transaction may include the transfer of one or more data frames formatted in accordance with the I3C protocol. The method may include receiving an acknowledgement from a slave device in response to the first two-bit command.

24 Claims, 25 Drawing Sheets

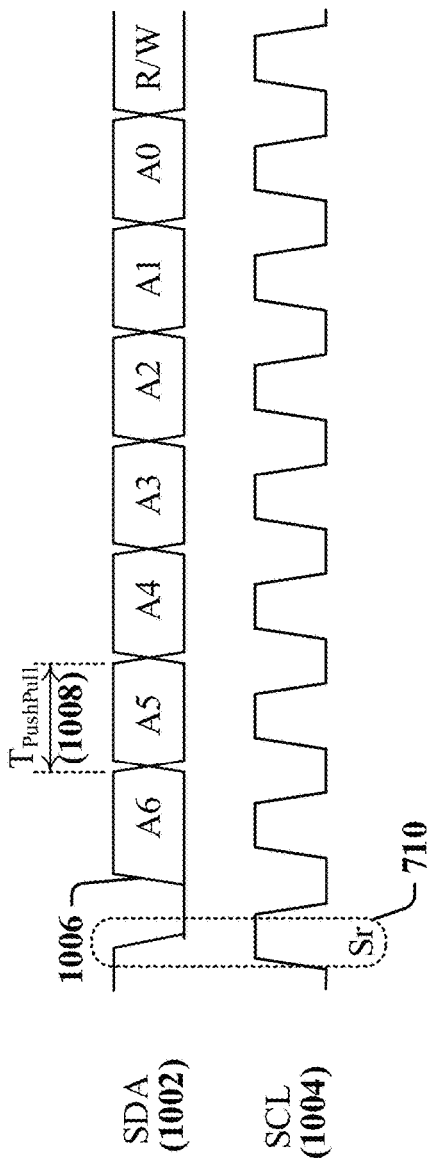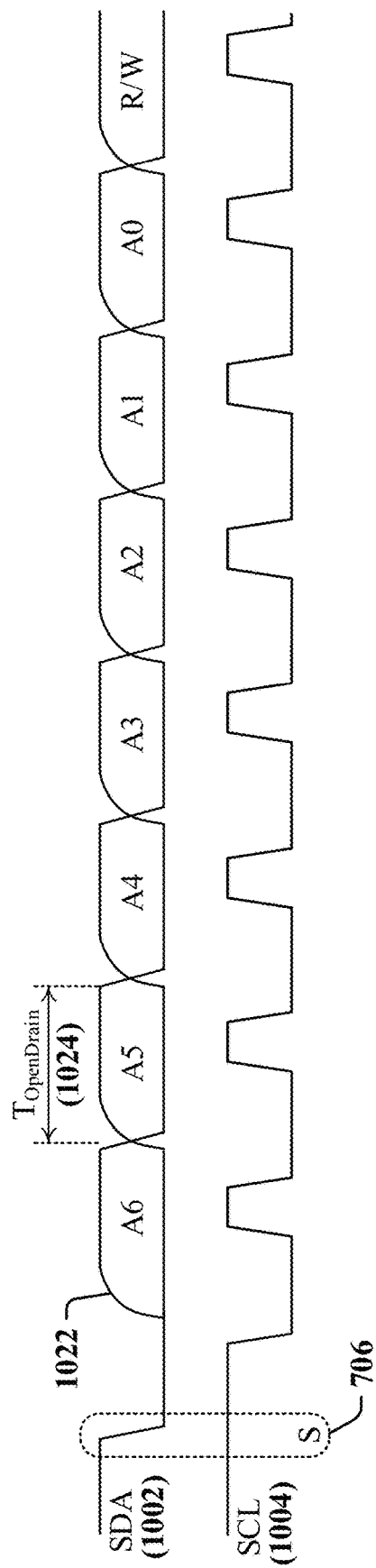
FIG. 10

FIG. 18

I3C Directed CCC Read

| S or Sr | I3C Reserved Byte (7'htE) (RnW0) | ACK | I3C Directed CCC (0x80 to 0xFE) | T | Sr | I3C Slave Address (RnW=1) | ACK | Optional Read Data | T |
|---|---|---|---|---|---|---|---|---|---|
| 1902 | 1904 | 1906 | 1908 | 1910 | 1912 | 1914 | 1916 | | |

| Sr | I3C Slave Address (RnW=1) | ACK | Optional Read Data | T | (Sr...7h'7E) or P |
|---|---|---|---|---|---|
| 1918 | 1920 | 1922 | 1924 | 1926 | |

1900

Point-to-Point I3C Directed CCC Read

| S or Sr | A/C | R/$\overline{W}$ | ACK | I3C Directed CCC (0x80 to 0xFE) | T | Sr | A/C | R/$\overline{W}$ | ACK | Optional Read Data | T |
|---|---|---|---|---|---|---|---|---|---|---|---|
| 1952 | 1954 | 1956 | 1958 | 1960 | 1962 | 1964 | 1966 | 1968 | 1970 | | |

| Sr | A/C | R/$\overline{W}$ | ACK | Optional Read Data | T | (Sr...7h'7E) or P |
|---|---|---|---|---|---|---|
| 1972 | 1974 | 1976 | 1978 | 1980 | 1982 | |

I3C In-Band Interrupt

| Driver Mode | Open Drain | Open Drain | Open Drain | Hand-Off | Push-Pull | Drive High/Low, then High Z | Push-Pull |
|---|---|---|---|---|---|---|---|
| ... | S | Slave_addr as IBI/R | Master_ACK | SCL High | Slave_Byte | T | Sr |
| 2002 | 2004 | 2006 | 2008 | 2010 | 2012 | 2014 |

2000

Point-to-Point I3C In-Band Interrupt

| Driver Mode | Open Drain | Open Drain | Open Drain | Hand-Off | Push-Pull | Drive High/Low, then High Z | Push-Pull |
|---|---|---|---|---|---|---|---|
| ... | S | 'b0 | Master_ACK | SCL High | Slave_Byte | T | Sr |
| 2052 | 2054 | 2056 | 2058 | 2060 | 2062 | 2064 |

I3C POINT TO POINT

TECHNICAL FIELD

The present disclosure relates generally to an interface between processing circuits and peripheral devices and more particularly, to optimizing operations on a serial bus when the serial bus is in a point-to-point configuration.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol. In one example, a serial bus operated in accordance with an Inter-Integrated Circuit (I2C bus or I²C). The I2C bus was developed to connect low-speed peripherals to a processor, where the I2C bus is configured as a multi-drop bus. A two-wire I2C bus includes a Serial Data Line (SDA) that carries a data signal, and a Serial Clock Line (SCL) that carries a clock signal.

A serial bus may employ a multi-master protocol in which one or more devices can serve as a master and a slave for different messages transmitted on the serial bus. In some examples, Improved Inter-Integrated Circuit (I3C) protocols may be used to control operations on a serial bus. I3C protocols are defined by the Mobile Industry Processor Interface Alliance (MIPI) and derive certain implementation aspects from the I2C protocol. Original implementations of the I2C protocol supported data signaling rates of up to 100 kilobits per second (100 kbps) in standard-mode operation, with more recent standards supporting speeds of 400 kbps in fast-mode operation, and 1 megabit per second (Mbps) in fast-mode plus operation.

As applications have become more complex, it has become desirable to increase performance and throughput provided by serial buses used to couple two or more devices.

SUMMARY

Certain aspects of the disclosure relate to systems, apparatus, methods and techniques that reduce the overhead of transmissions when an I3C bus as a point-to-point architecture.

In an aspect of the disclosure, a method for data communication performed at a master device includes configuring a serial interface for a point-to-point mode of operation, transmitting a first two-bit command through the serial interface, the two-bit command including a one-bit address and a read/write bit, and initiating a transaction through the serial interface. The transaction may be identified by the two-bit command and is conducted in accordance with an I3C protocol. The transaction may include the transfer of one or more data frames formatted in accordance with the I3C protocol. The method may include receiving an acknowledgement from a slave device in response to the first two-bit command.

In one aspect, the method includes transmitting an I3C Common Command Code (CCC) after transmitting the two-bit command when the one-bit address has a first value, and conducting a private transaction when the one-bit address has a second value. The read/write bit may select between a private read transaction and a private write transaction.

In certain aspects, the method includes initiating transmission of a second two-bit command through the serial interface after the transaction has been completed, and initiating an in-band interrupt service procedure when a data line of the serial interface is driven by a slave device before completion of transmission of the second two-bit command. The method may include transferring control of the serial interface to the slave device after completion of the interrupt service procedure.

In certain aspects, the method includes identifying a slave device coupled to the serial interface, determining that no other device is actively coupled to the serial interface, and configuring one or more registers of the slave device to cause slave device to enter the point-to-point mode of operation. The method may include transmitting a reset pattern through the serial interface. The reset pattern may be configured to cause the slave device to exit the point-to-point mode of operation.

In an aspect of the disclosure, a method for data communication performed at a slave device includes configuring a serial interface for a point-to-point mode of operation, receiving a first two-bit command through the serial interface, the two-bit command including a one-bit address and a read/write bit, and participating in a transaction conducted through the serial interface. The transaction may be identified by the two-bit command and is conducted in accordance with an I3C protocol. The transaction may include the transfer of one or more data frames formatted in accordance with the I3C protocol. The method may include transmitting an acknowledgement from a slave device in response to the first two-bit command.

In one aspect, the method includes receiving an I3C CCC after receiving the two-bit command when the one-bit address has a first value, and participating in a private transaction when the one-bit address has a second value. The read/write bit may select between a private read transaction and a private write transaction.

In certain aspects, the method includes detecting a START condition on the serial interface after the transaction has been completed, and driving a data line of the serial interface to request an in-band interrupt service procedure. The method may include obtaining control of the serial interface after completion of the interrupt service procedure.

In one aspect, the method includes detecting a reset pattern in a signal received from the serial interface, and exiting the point-to-point mode of operation in response to the reset pattern.

In an aspect of the disclosure, a data communication apparatus has a processor and a serial interface having a clock line and a data line. The processor may configure the serial interface for a point-to-point mode of operation, transmit a first two-bit command through the serial interface, the two-bit command including a one-bit address and a read/write bit, and initiate a transaction through the serial interface. The transaction may be identified by the two-bit command and is conducted in accordance with an I3C protocol.

In an aspect of the disclosure, a data communication apparatus has a processor and a serial interface having a clock line and a data line. The processor may configure the serial interface for a point-to-point mode of operation, receive a first two-bit command through the serial interface, the two-bit command including a one-bit address and a read/write bit, and participate in a transaction through the serial interface. The transaction may be identified by the two-bit command and is conducted in accordance with an I3C protocol.

In an aspect of the disclosure, a processor-readable storage medium includes code which, when executed by a processor, causes the processor to configure a serial interface for a point-to-point mode of operation, transmit a first two-bit command through the serial interface, the two-bit command including a one-bit address and a read/write bit, and initiating a transaction through the serial interface. The transaction may be identified by the two-bit command and is conducted in accordance with an I3C protocol.

In an aspect of the disclosure, a processor-readable storage medium includes code which, when executed by a processor, causes the processor to configure a serial interface for a point-to-point mode of operation, receive a first two-bit command through the serial interface, the two-bit command including a one-bit address and a read/write bit, and participate in a transaction conducted through the serial interface. The transaction may be identified by the two-bit command and is conducted in accordance with an I3C protocol.

BRIEF DESCRIPTION OF THE DRAWINGS

FIG. 10 illustrates a non-arbitrable address header and an arbitrable address header that may be transmitted in accordance with I3C protocols.

FIG. 18 illustrates a basic I3C Directed CCC Write transaction and a corresponding point-to-point I3C Directed CCC Write transaction provided in accordance with certain aspects disclosed herein.

FIG. 19 illustrates a basic I3C Directed CCC Read transaction and a corresponding point-to-point I3C Directed CCC Read transaction provided in accordance with certain aspects disclosed herein.

FIG. 20 illustrates a basic I3C in-band interrupt (MI) procedure and an example of a corresponding modified point-to-point I3C IBI procedure provided in accordance with certain aspects disclosed herein.

DETAILED DESCRIPTION

Figure 1:
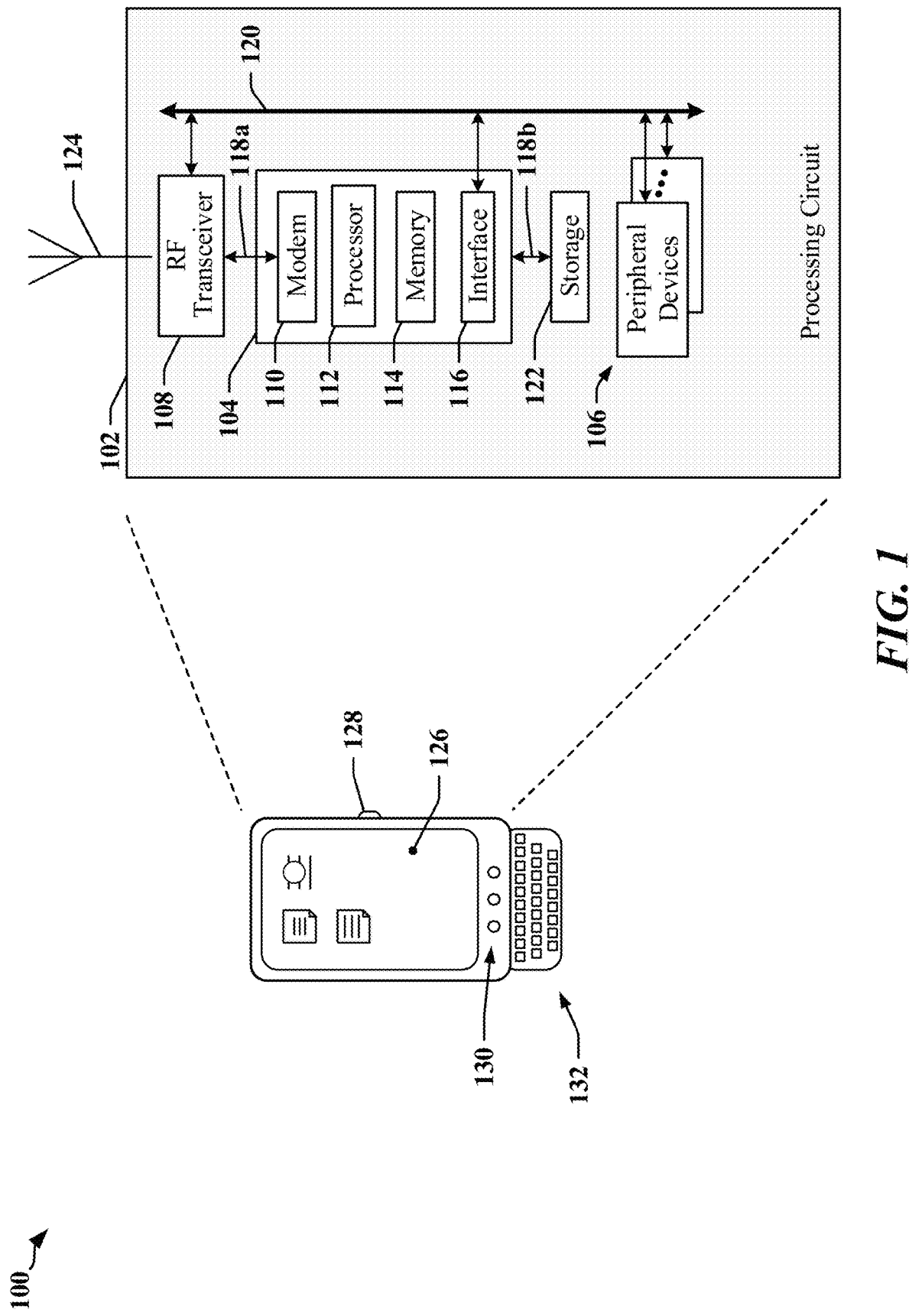
FIG. 1 illustrates an apparatus employing a data link between IC devices that is selectively operated according to one of a plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a serial bus to connect application processor or other host device with modems and other peripherals. The serial bus may be operated in accordance with specifications and protocols defined by a standards body. In various examples illustrated in this disclosure, the serial bus may be operated in accordance with a standard or protocol that defines timing relationships between signals and transmissions, such as an I2C and/or I3C protocol. In certain applications, a multidrop serial bus may be used to connect pair of devices in a point-to-point architecture. The point-to-point architecture may be employed when an application requires or calls for a secure connection between the pair of devices. In some instances, the use of a point-to-point architecture may yield performance benefits measurable in higher throughput, lower latency, and/or faster bus turnaround. Certain aspects disclosed herein can maximize the performance benefits, and can enable further improvements in performance. In one aspect, for example, control overhead can be reduced by truncating certain address fields.

Example of an Apparatus with a Serial Data Link

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
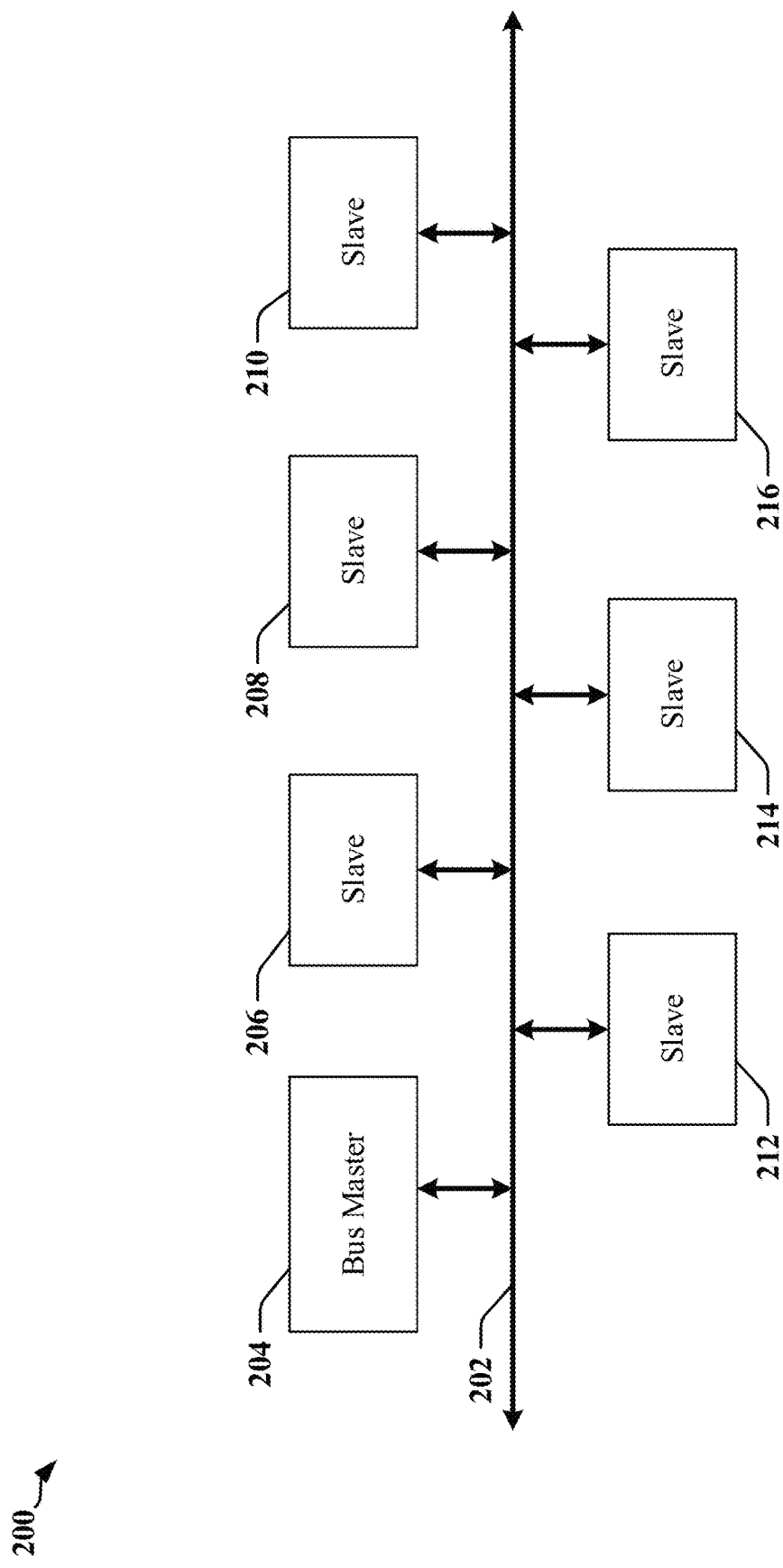
FIG. 2 illustrates a communication interface in which a plurality of devices is connected using a serial bus.

FIG. 2 illustrates a communication link 200 in which a configuration of devices 204, 206, 208, 210, 212, 214 and 216 are connected using a serial bus 202. In one example, the devices 204, 206, 208, 210, 212, 214 and 216 may be adapted or configured to communicate over the serial bus 202 in accordance with an I3C protocol. In some instances, one or more of the devices 204, 206, 208, 210, 212, 214 and 216 may alternatively or additionally communicate using other protocols, including an I2C protocol, for example.

Communication over the serial bus 202 may be controlled by a master device 204. In one mode of operation, the master device 204 may be configured to provide a clock signal that controls timing of a data signal. In another mode of operation, two or more of the devices 204, 206, 208, 210, 212, 214 and 216 may be configured to exchange data encoded in symbols, where timing information is embedded in the transmission of the symbols.

Figure 3:
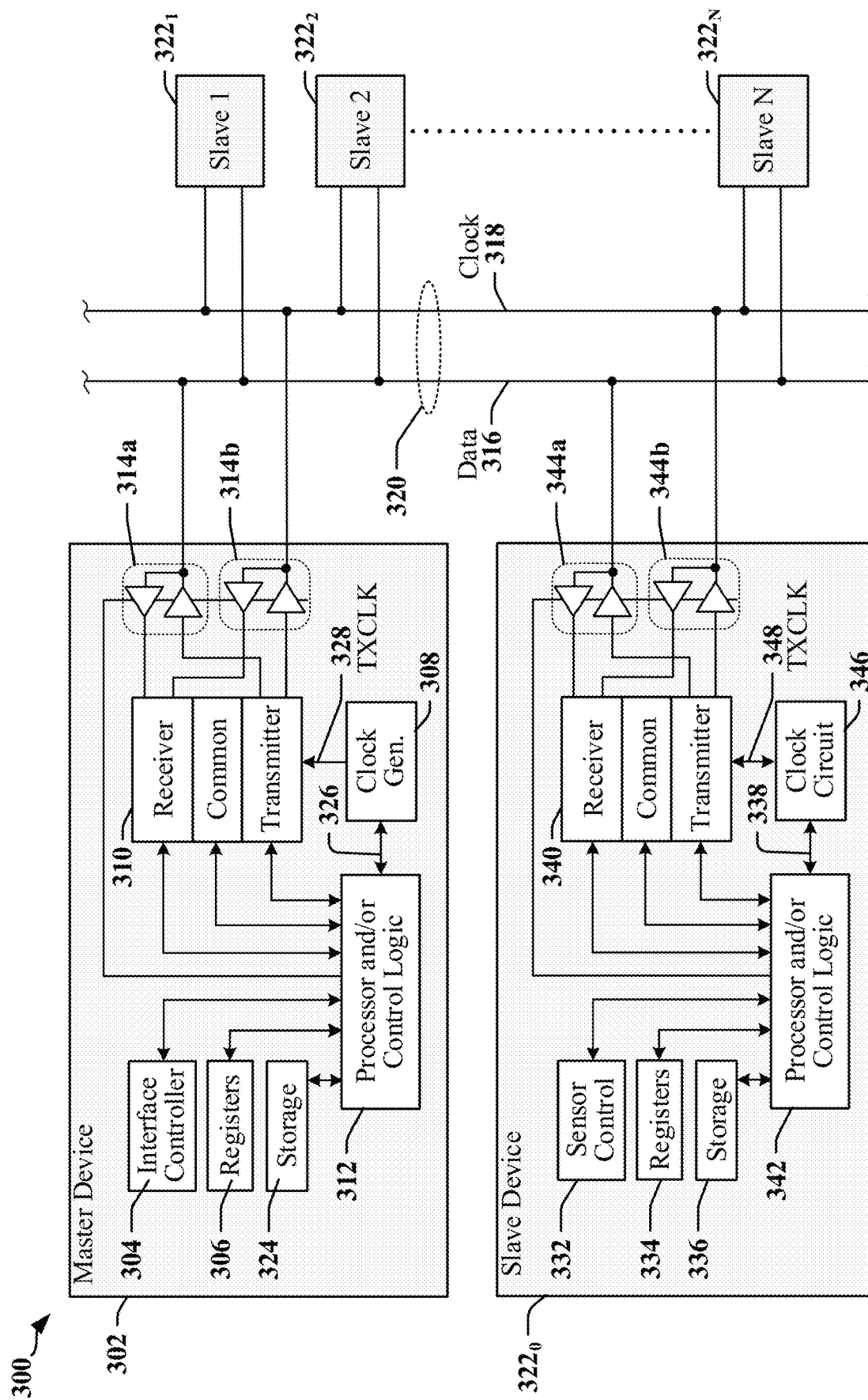
FIG. 3 illustrates certain aspects of an apparatus that includes multiple devices connected to a serial bus.

FIG. 3 illustrates certain aspects of an apparatus 300 that includes multiple devices 302, and $322_0$-$322_N$ coupled to a serial bus 320. The devices 302 and $322_0$-$322_N$ may be implemented in one or more semiconductor IC devices, such as an applications processor, SoC or ASIC. In various implementations the devices 302 and $322_0$-$322_N$ may include, support or operate as a modem, a signal processing device, a display driver, a camera, a user interface, a sensor, a sensor controller, a media player, a transceiver, and/or other such components or devices. In some examples, one or more of the slave devices $322_0$-$322_N$ may be used to control, manage or monitor a sensor device. Communications between devices 302 and $322_0$-$322_N$ over the serial bus 320 is controlled by a bus master device 302. Certain types of bus can support multiple bus master devices 302.

In one example, a bus master device 302 may include an interface controller 304 that may manage access to the serial bus, configure dynamic addresses for slave devices $322_0$-$322_N$ and/or generate a clock signal 328 to be transmitted on a clock line 318 of the serial bus 320. The bus master device 302 may include configuration registers 306 or other storage 324, and other control logic 312 configured to handle protocols and/or higher-level functions. The control logic 312 may include a processing circuit such as a state machine, sequencer, signal processor or general-purpose processor. The bus master device 302 includes a transceiver 310 and line drivers/receivers 314a and 314b. The transceiver 310 may include receiver, transmitter and common circuits, where the common circuits may include timing, logic and storage circuits and/or devices. In one example, the transmitter encodes and transmits data based on timing in the clock signal 328 provided by a clock generation circuit 308. Other timing clocks 326 may be used by the control logic 312 and other functions, circuits or modules.

At least one device $322_0$-$322_N$ may be configured to operate as a slave device on the serial bus 320 and may include circuits and modules that support a display, an image sensor, and/or circuits and modules that control and communicate with one or more sensors that measure environmental conditions. In one example, a slave device $322_0$ configured to operate as a slave device may provide a control function, module or circuit 332 that includes circuits and modules to support a display, an image sensor, and/or circuits and modules that control and communicate with one or more sensors that measure environmental conditions. The slave device $322_0$ may include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 310 may include receiver, transmitter and common circuits, where the common circuits may include timing, logic and storage circuits and/or devices. In one example, the transmitter encodes and transmits data based on timing in a clock signal 348 provided by clock generation and/or recovery circuits 346. The clock signal 348 may be derived from a signal received from the clock line 318. Other timing clocks 338 may be used by the control logic 342 and other functions, circuits or modules.

The serial bus 320 may be operated in accordance with RFFE, I2C, I3C, SPMI, or other protocols. At least one device 302, $322_0$-$322_N$ may be configured to operate as a master device and a slave device on the serial bus 320. Two or more devices 302, $322_0$-$322_N$ may be configured to operate as a master device on the serial bus 320.

In some implementations, the serial bus 320 may be operated in accordance with an I3C protocol. Devices that communicate using the I3C protocol can coexist on the same serial bus 320 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 320, in addition to data formats and aspects of bus control. In some aspects, the I2C and I3C protocols may define direct current (DC) characteristics affecting certain signal levels associated with the serial bus 320, and/or alternating current (AC) characteristics affecting certain timing aspects of signals transmitted on the serial bus 320. In some examples, a 2-wire serial bus 320 transmits data on a data line 316 and a clock signal on the clock line 318. In some instances, data may be encoded in the signaling state, or transitions in signaling state of the data line 316 and the clock line 318.

Data Transfers Over a Serial Bus

Examples of data transfers including control signaling, command and payload transmissions are provided by way of example. The examples illustrated relate to I2C and I3C communication for convenience. However, certain concepts disclosed herein are applicable to other bus configurations and protocols, including RFFE and SPMI configurations. Certain concepts are applicable to serial buses that are operated in accordance with various I3C protocols. In one example, these concepts may be implemented when the serial bus is operated in accordance with an I3C HDR protocol that encodes data in ternary symbols (HDR-TSP), where timeslots may be defined in HDR-TSP words or in sets of six successive recovered clock pulses, which is the equivalent number of clock pulses for an HDR-TSP word. In another example, these concepts may be implemented when the serial bus is operated in accordance with an I3C HDR double data rate (HDR-DDR) protocol, where timeslots may be defined in HDR-DDR words or in the number of clock pulses. In another example, these concepts may be implemented when the serial bus is operated in accordance with a protocol that supports multiple data lanes.

Figure 4:
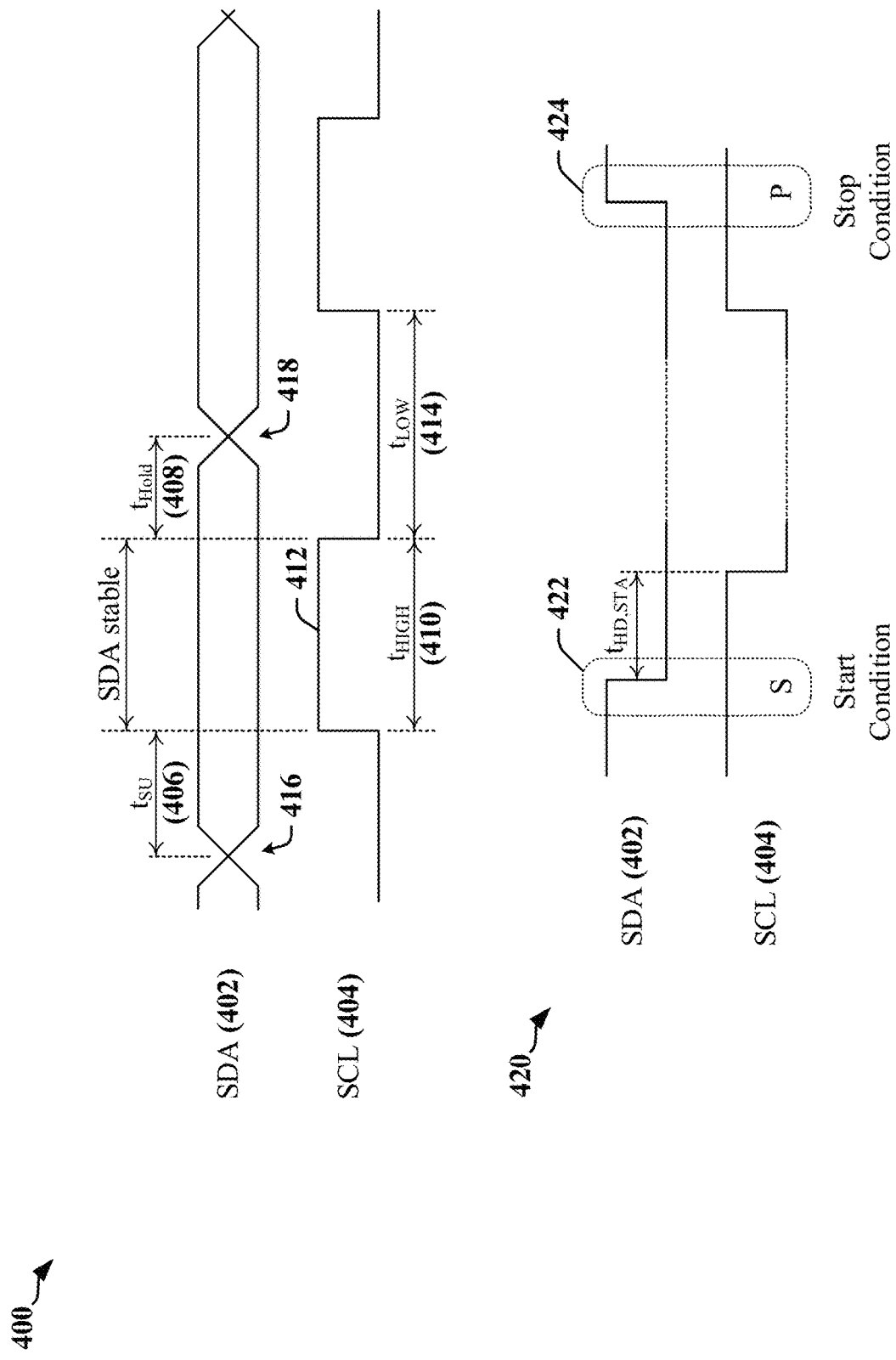
FIG. 4 illustrates certain aspects of the timing relationship between SDA and SCL wires on a conventional I2C bus.

FIG. 4 includes timing diagrams 400 and 420 that illustrate the relationship between the SDA wire 402 and the SCL wire 404 on when the serial bus is operated in an I2C or I3C mode. The first timing diagram 400 illustrates the timing relationship between the SDA wire 402 and the SCL wire 404 while data is being transferred on the conventionally configured I2C bus. The SCL wire 404 provides a series of pulses that can be used to sample data in the SDA wire 402. The pulses (including the pulse 412, for example) may be defined as the time during which the SCL wire 404 is determined to be in a high logic state at a receiver. When the SCL wire 404 is in the high logic state during data transmission, data on the SDA wire 402 is required to be stable and valid; the state of the SDA wire 402 is not permitted to change when the SCL wire 404 is in the high logic state.

In one example, specifications for conventional I2C protocol implementations (which may be referred to as "I2C Specifications") define a minimum duration 410 ($t_{HIGH}$) of the high period of the pulse 412 on the SCL wire 404. The I2C Specifications also define minimum durations for a setup time 406 ($t_{SU}$) before occurrence of the pulse 412, and a hold time 408 ($t_{Hold}$) after the pulse 412 terminates. The signaling state of the SDA wire 402 is expected to be stable during the setup time 406 and the hold time 408. The setup time 406 defines a maximum time period after a transition 416 between signaling states on the SDA wire 402 until the arrival of the rising edge of the pulse 412 on the SCL wire 404. The hold time 408 defines a minimum time period after the falling edge of the pulse 412 on the SCL wire 404 until a next transition 418 between signaling states on the SDA wire 402. The I2C Specifications also define a minimum duration 414 for a low period ($t_{LOW}$) for the SCL wire 404. The data on the SDA wire 402 is typically stable and/or can be captured for the duration 410 ($t_{HIGH}$) when the SCL wire 404 is in the high logic state after the leading edge of the pulse 412.

The second timing diagram 420 of FIG. 4 illustrates signaling states on the SDA wire 402 and the SCL wire 404 between data transmissions on a serial bus. Certain protocols provide for transmission of 8-bit data (bytes) and 7-bit addresses. A receiver may acknowledge transmissions by driving the SDA wire 402 to the low logic state for one clock period. The low signaling state represents an acknowledgement (ACK) indicating successful reception and a high signaling state represents a negative acknowledgement (NACK) indicating a failure to receive or an error in reception.

A start condition 422 is defined to permit the current bus master to signal that data is to be transmitted. The start condition 422 occurs when the SDA wire 402 transitions from high to low while the SCL wire 404 is high. The bus master initially transmits the start condition 422, which may be also be referred to as a start bit, followed by a 7-bit address of an I2C slave device with which it wishes to exchange data. The address is followed by a single bit that indicates whether a read or write operation is to occur. The addressed slave device, if available, responds with an ACK bit. If no slave device responds, the bus master may interpret the high logic state of the SDA wire 402 as a NACK. The master and slave devices may then exchange bytes of information in data frames, in which the bytes are serialized such that the most significant bit (MSB) is transmitted first. The transmission of the byte is completed when a stop condition 424 is transmitted by the master device. The stop condition 424 occurs when the SDA wire 402 transitions from low to high while the SCL wire 404 is high.

Figure 5:
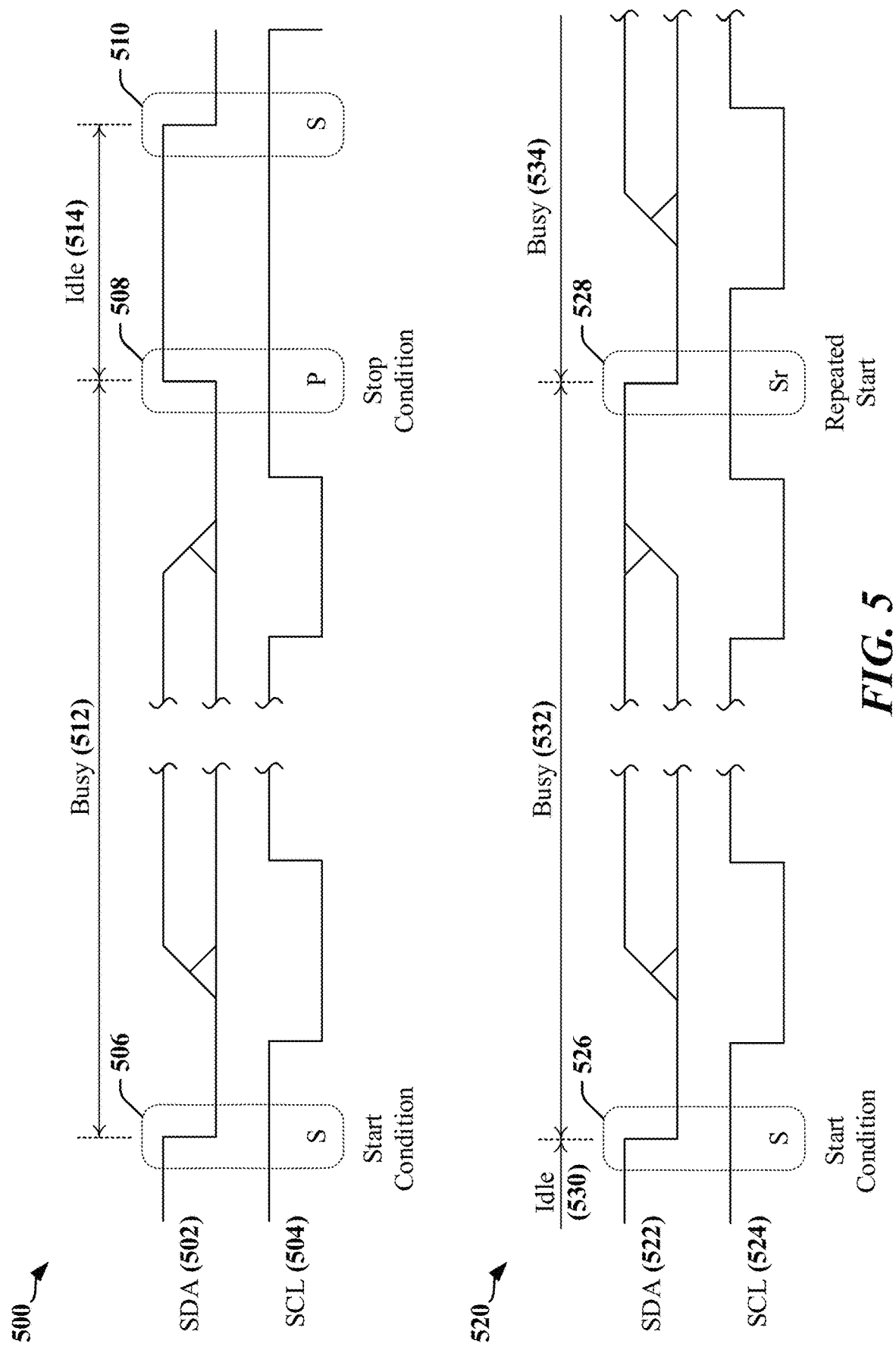
FIG. 5 is a timing diagram that illustrates timing associated with multiple frames transmitted on an I2C bus.

FIG. 5 includes diagrams 500 and 520 that illustrate timing associated with data transmissions on a serial bus operated in accordance with an I2C or I3C protocol. As illustrated in the first diagram 500, an idle period 514 may occur between a stop condition 508 and a consecutive start condition 510. In the illustrated example, the SDA line 502 and SCL line 504 may be held and/or driven to a high voltage state during the idle period 514. This idle period 514 may be prolonged, and may result in reduced data throughput when the serial bus remains idle between the stop condition 508 and the consecutive start condition 510. In operation, a busy period 512 commences when the I2C bus master transmits a first start condition 506, followed by data. The busy period 512 ends when the bus master transmits a stop condition 508 and the idle period 514 ensues. The idle period 514 ends when a second start condition 510 is transmitted.

The second timing diagram 520 illustrates a method by which the number of occurrences of an idle period 514 may be reduced. In the illustrated example, data is available for transmission before a first busy period 532 ends. The bus master device may transmit a repeated start condition 528 (Sr) rather than a stop condition. The repeated start condition 528 terminates the preceding data transmission and simultaneously indicates the commencement of a next data transmission. The state transition on the SDA wire 522 corresponding to the repeated start condition 528 is identical to the state transition on the SDA wire 522 for a start condition 526 that occurs after an idle period 530. For both the start condition 526 and the repeated start condition 528, the SDA wire 522 transitions from high to low while the SCL wire 524 is high. When a repeated start condition 528 is used between data transmissions, a first busy period 532 is immediately followed by a second busy period 534.

Figure 6:
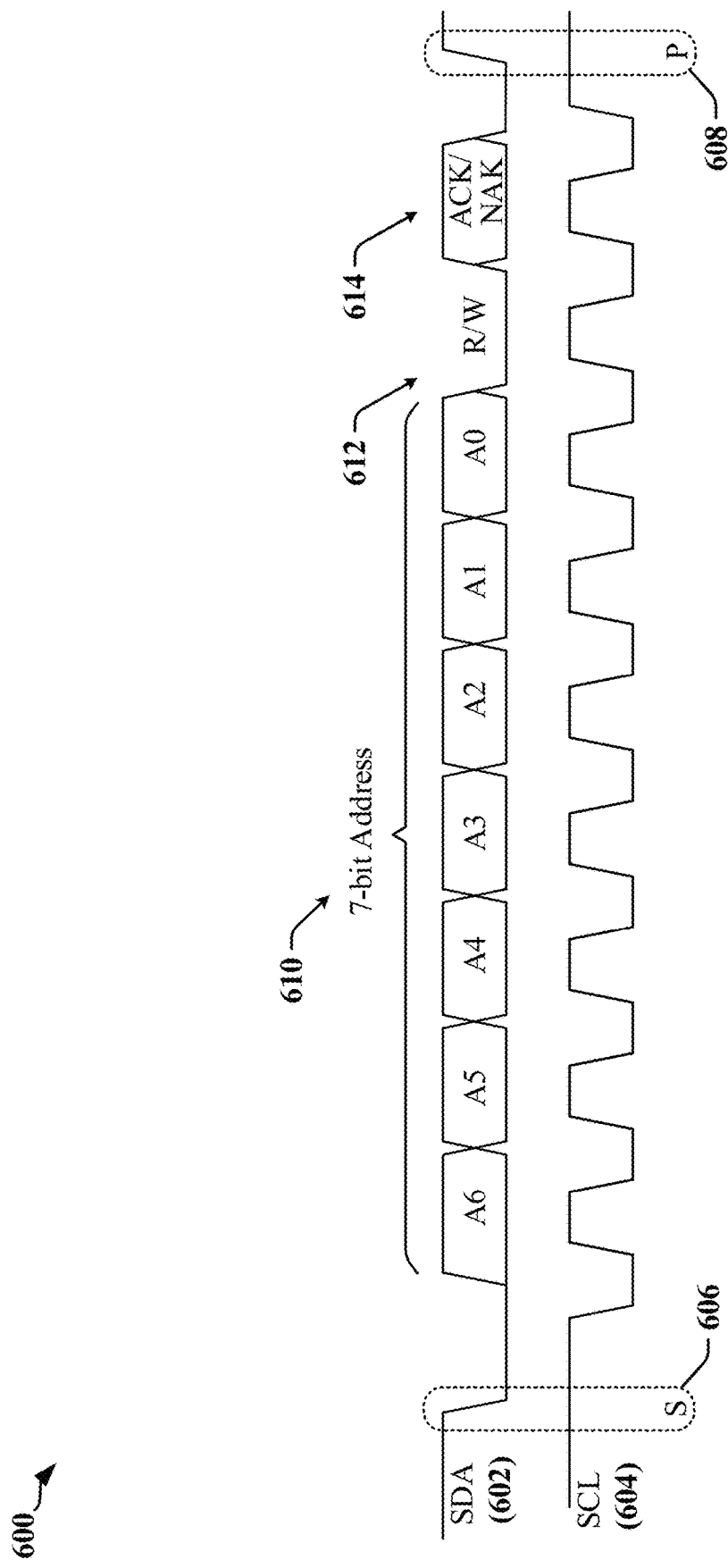
FIG. 6 illustrates timing related to a command word sent to a slave device in accordance with I2C protocols.

FIG. 6 is a diagram 600 that illustrates an example of the timing associated with an address word sent to a slave device in accordance with certain I2C and/or I3C protocols. The address word is transmitted using drivers that are operated in an open-drain mode. In the example, a master device initiates the transaction with a start condition 606, whereby the SDA wire 602 is driven from high to low while the SCL wire remains high. The master device then transmits a clock signal on the SCL wire 604. The seven-bit address 610 of a slave device is then transmitted on the SDA wire 602. The seven-bit address 610 is followed by a Write/Read command bit 612, which indicates "Write" when low and "Read" when high. The slave device may respond in the next clock interval 614 with an acknowledgment (ACK) by driving the SDA wire 602 low. If the slave device does not respond, the SDA wire 602 is pulled high and the master device treats the lack of response as a NACK. The master device may terminate the transaction with a stop condition 608 by driving the SDA wire 602 from low to high while the SCL wire 604 is high. This transaction can be used to determine whether a slave device with the transmitted address coupled to the serial bus is in an active state.

Figure 7:
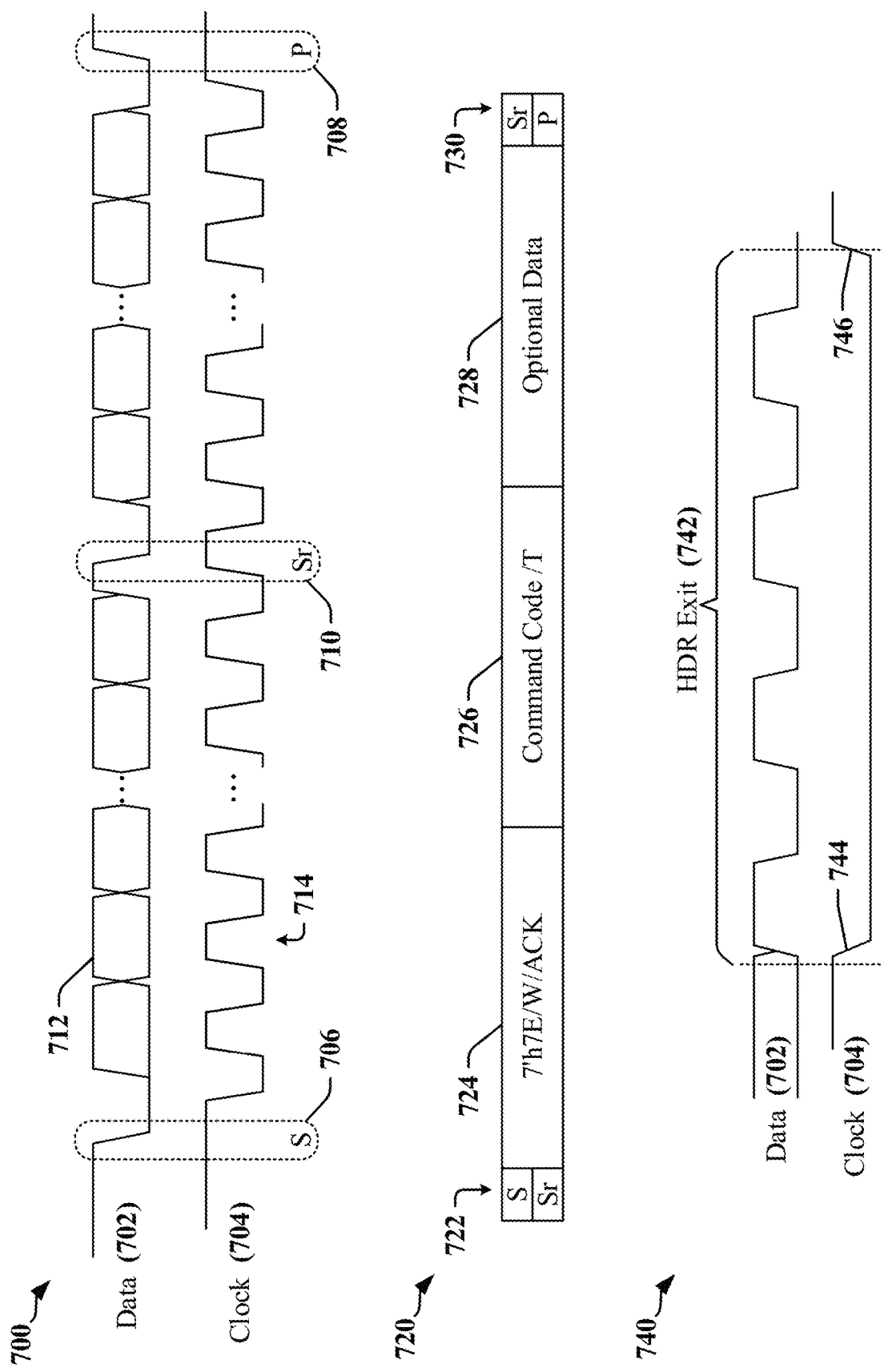
FIG. 7 includes a timing diagram that illustrates an example of signaling on a serial bus when the serial bus is operated in a mode of operation defined by I3C specifications.

FIG. 7 includes a timing diagram 700 that illustrates signaling on a serial bus when the serial bus is operated in an SDR mode of operation defined by I3C specifications. Data transmitted on a first wire of the serial bus, which may be referred to as the Data wire 702, SDA or SDATA, may be captured using a clock signal transmitted on a second wire of the serial bus, which may be referred to as the Clock wire 704 or SCL. During data transmission, the signaling state 712 of the Data wire 702 (SDA) is expected to remain constant for the duration of the pulses 714 when the Clock wire 704 is at a high voltage level. Transitions on the Data wire 702 when the Clock wire 704 is at the high voltage level indicate a START condition 706, a STOP condition 708 or a Repeated Start 710.

On an I3C serial bus, a START condition 706 is defined to permit the current bus master to signal that data is to be transmitted. The START condition 706 occurs when the Data wire 702 transitions from high to low while the Clock wire 704 is high. The bus master may signal completion and/or termination of a transmission using a STOP condition 708. The STOP condition 708 is indicated when the Data wire 702 transitions from low to high while the Clock wire 704 is high. A Repeated Start 710 may be transmitted by a bus master that wishes to initiate a second transmission upon completion of a first transmission. The Repeated Start 710 is transmitted instead of a STOP condition 708, and has the significance of a STOP condition 708 followed immediately by a START condition 706. The Repeated Start 710 occurs when the Data wire 702 transitions from high to low while the Clock wire 704 is high.

FIG. 7 illustrates a CCC transmission 720 by the bus master. The CCC transmission 720 occurs when the serial bus is operated in an SDR mode of operation defined by I3C specifications. The bus master may transmit an initiator 722 that may be a START condition or a Repeated Start prior to transmitting an address of a slave, a command, and/or data. The initiator 722 may be followed in transmission by an address header 724 and a command code 726. The command code 726 may, for example, cause the serial bus to transition to a desired mode of operation. In some instances, data 728 may be transmitted. The CCC transmission 720 may be followed by a terminator 730 that may be a STOP condition 708 or a Repeated Start 710.

Certain serial bus interfaces support signaling schemes that provide higher data rates. In one example, I3C specifications define multiple high data rate (HDR) modes, including a high data rate, double data rate (HDR-DDR) mode in which data is transferred at both the rising edge and the falling edge of the clock signal. A bus master may transmit CCCs to switch the mode of operation of an I3C bus between SDR and HDR modes.

FIG. 7 includes an example of signaling 740 transmitted on the Data wire 702 and the Clock wire 704 to initiate a restart, exit and/or break from I3C HDR modes of communication. The signaling 740 includes an HDR Exit 742 that may be used to cause an HDR break or exit. The HDR Exit 742 commences with a falling edge 744 on the Clock wire 704 and ends with a rising edge 746 on the Clock wire 704. While the Clock wire 704 is in a low signaling state, four pulses are transmitted on the Data wire 702. I2C devices ignore the Data wire 702 when no pulses are provided on the Clock wire 704.

Figure 8:
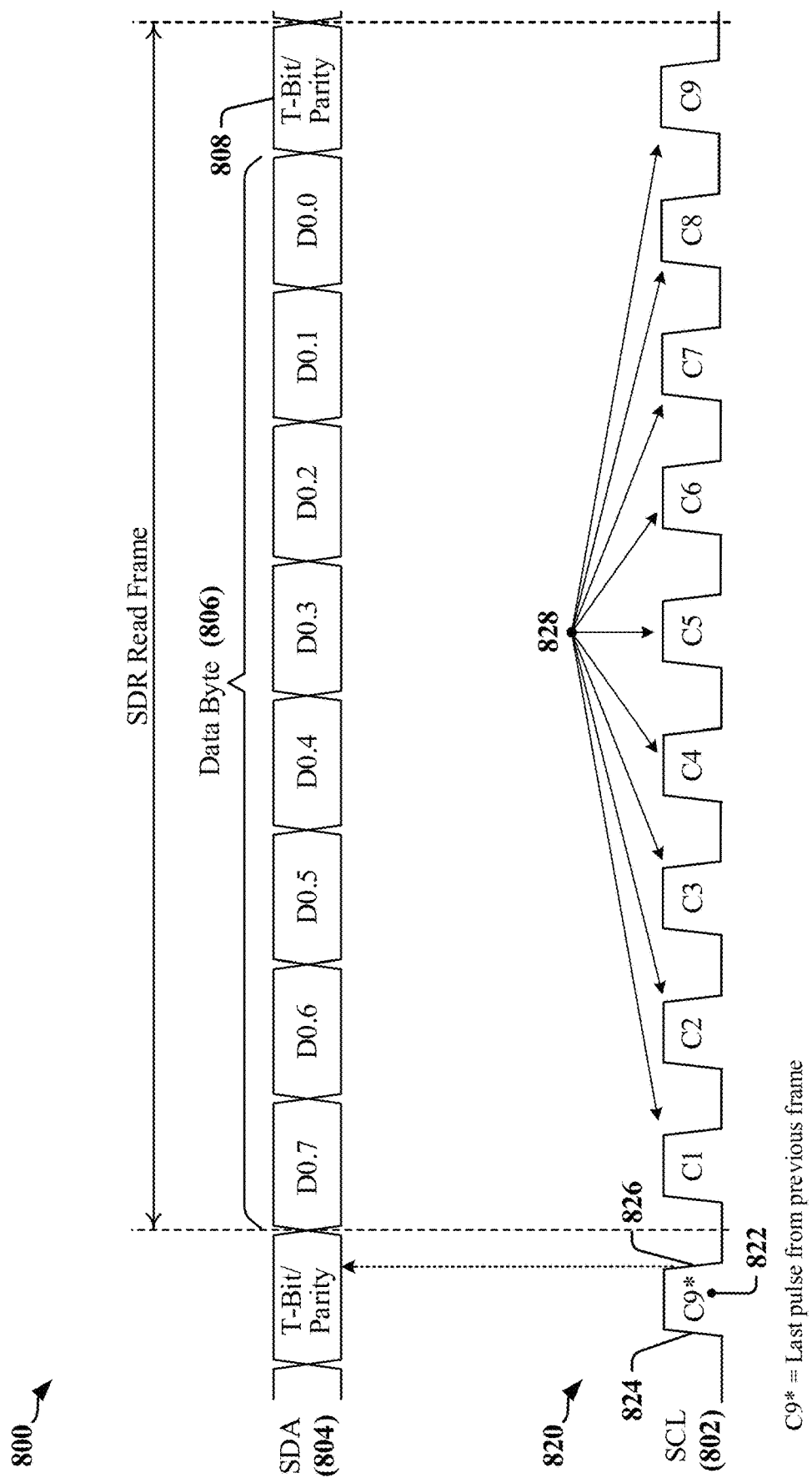
FIG. 8 is a timing diagram that illustrates an example of a transmission of a data frame in an I3C single data rate mode.
Figure 9:
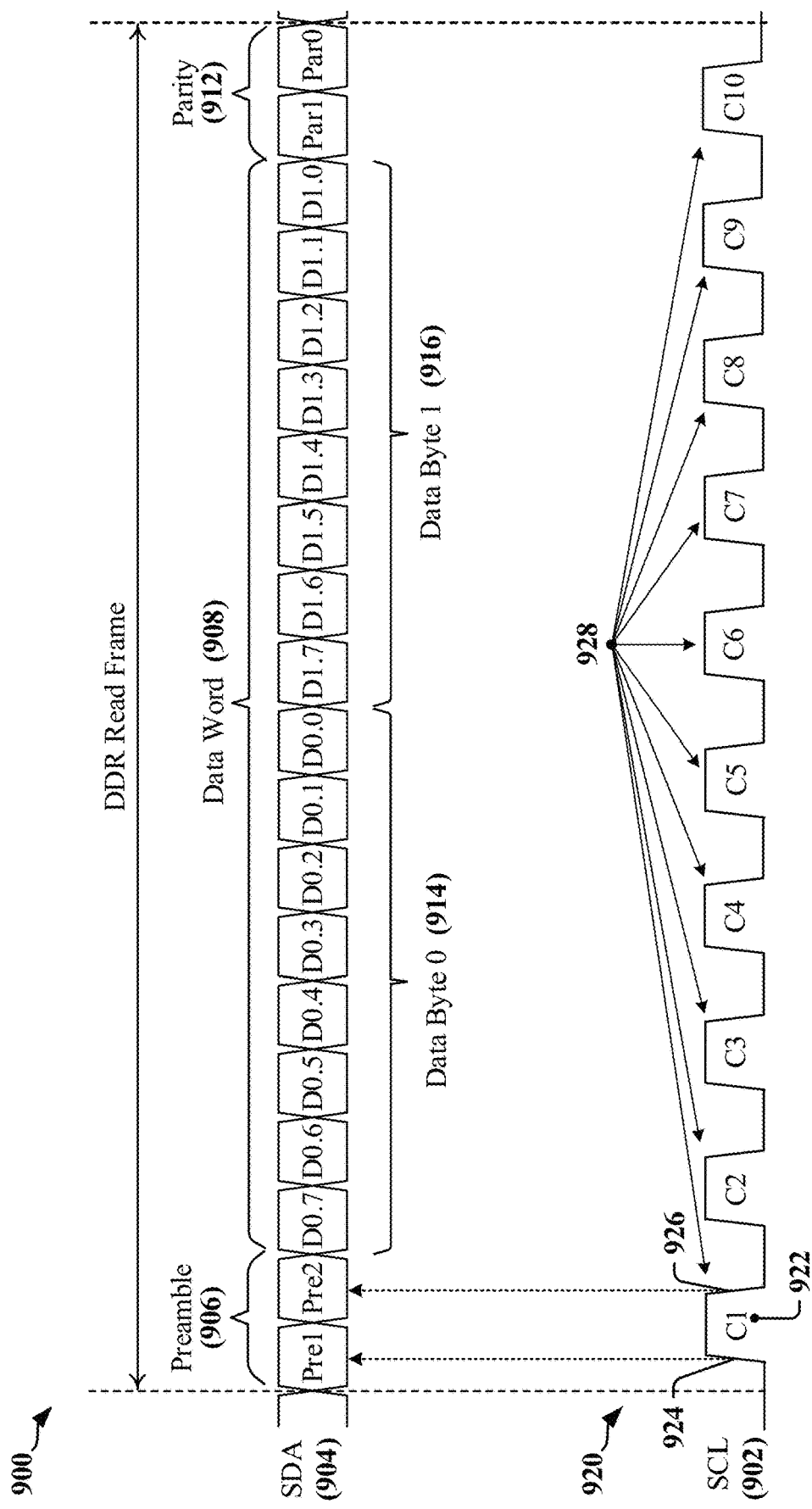
FIG. 9 is a timing diagram that illustrates an example of a transmission of a data frame in an I3C high data rate mode, where data is transmitted at double data rate (DDR).

FIGS. 8 and 9 include timing diagrams that illustrate data frames 800, 900 transmitted on a serial bus when a bus master device is reading from a slave device. The serial bus has a clock wire (SCL 802, 902) and a Data wire (SDA 804, 904). A clock signal 820, 920 transmitted on SCL 802, 902 provides timing may be usable when the serial bus is operated in an I3C SDR mode and in an I3C HDR-DDR mode. The clock signal includes pulses 822, 828, 922, 928 that are defined by a rising edge 824, 924 and a falling edge 826, 926. A bus master device transmits the clock signal on the SCL 802, 902 regardless of the direction of flow of data over the serial bus.

FIG. 8 illustrates a data frame 800 transmitted while the serial bus is operated in the I3C SDR mode. A single byte of data 806 is transmitted in each data frame 800. The data signal transmitted on SDA 804 is expected to be stable for the duration of the high state of the pulses 828 in the clock signal 820 and, in one example, the state of SDA 804 is sampled on the falling edges of the clock pulses 828. Each byte of data 806 is followed by a bit 808 that can serve as a parity bit or a transition bit (T-Bit).

FIG. 9 illustrates a data frame 900 transmitted while the serial bus is operated in the HDR-DDR mode. In the HDR-DDR mode, data is transferred at both the rising edge 924 and the falling edge 926 of a pulse 922 in the clock signal 920. A receiver samples or captures one bit of data on SDA 904 at each edge of the pulses 928 in the clock signal 920. A 2-byte data word 908 is transmitted in each data frame 900 in the HDR-DDR mode. A data word 908 generally includes 16 payload bits, organized as two 8-bit bytes 914, 916 and the data word 908 is preceded by a two-bit preamble 906 and followed by two parity bits 912. The 20 bits in the data frame 900 can be transferred on the edges of 10 clock pulses. The integrity of the transmission may be protected by the transmission of the parity bits 912.

In-band interrupts may be used to gain access to an I3C serial bus through an enumeration process in which a master device can identify slave devices coupled to the I3C serial bus. The enumeration process may be used during system initialization to assign dynamic addresses to slave devices. The master device may use system initialization to permit the master device to determine capabilities of the slave devices and/or to configure one or more of the slave devices. In-band interrupts may also be used by slave devices to transmit high-priority and/or low-latency messages.

A device other than the current bus master may assert an in-band interrupt during transmission of certain address fields to initiate an arbitration process that enables the asserting device to gain access to a serial bus. The serial bus may be operated in a mode in which data is transmitted on a data line in accordance with timing provided by a clock signal transmitted on a clock line. FIG. 10 illustrates a non-arbitrable address header 1000 and an arbitrable address header 1020 that may be transmitted on the SDA line 1002 of the serial bus in accordance with I3C protocols. I3C protocols provide for different types of request to be transmitted using an I3C arbitrable address header. I3C arbitrable address headers 1020 can be transmitted after a START condition 706. An address header 724 transmitted after a Repeated Start 710 is not arbitrable. A device may use an I3C arbitrable address header to assert an In-Band Interrupt, make a secondary master request, or indicate a hot-join request.

A non-arbitrable address header 1000 is transmitted using push-pull drivers, while open-drain drivers are enabled during transmission of an arbitrable address header 1020. Rising edges 1006 in a push-pull transmission provide a shorter bit interval 1008 than the bit interval 1024 available during an open-drain transmission, due to the slow rise time of the pulled-up edges 1022 in a non-arbitrable address header 1000. In FIG. 10, the bit intervals 1008, 1024 are not depicted on a common scale.

A clock signal transmitted on the SCL line 1004 provides timing information that is used by a slave device to control transmission of bits on the SDA line 1002, where the clock signal may be used by a receiving device for sampling and/or capturing bits of data transmitted on the SDA line 1002. A bus master device may read one or more registers on a slave device or secondary master device that wins arbitration. In conventional systems, the bus master device may provide clock pulses in a clock signal that have a period sufficient to successfully read the slowest possible device coupled to the serial bus. Each slave device has different operating characteristics and limitations that affect the response time of the slave device. In one example, the response time of a slave device may be affected by the physical distance between the slave device and the bus master device. In another example, the response time of a slave device may be affected by the processing capabilities of the slave device, where a slower controller, state machine or other processor in the slave device may delay responses transmitted by the slave device during in-band interrupt handling and/or processing.

Common Command Codes

I3C protocols enable a serial bus to be operated as a serial, hierarchical, multi-master, multi-drop, two-wire data link. The I3C serial protocols support transactions in which a data payload is bookended by bus management commands. Bus management commands may be referred to as CCCs. The data payload can be transferred using one of several available data transfer protocols, including Single Data Rate (SDR) protocol, a High Data Rate (HDR) protocol, and variants of the HDR protocol including HDR at Double Data Rate (HDR-DDR), HDR using Ternary Symbols Legacy (HDR-TSL) and HDR using Ternary Symbols Pure (HDR-TSP). In HDR-DDR mode, a bit of data is transmitted on both the rising edge and falling edge of clock pulses. In HDR-TSL and HDR-TSP modes, both wires of the two-wire bus are used to encode data, and the data payload is encoded in ternary symbols that represent the signaling state of the two wires. The data transfer protocols may use different configurations of the same hardware components to offer significantly different data throughput, from simple SDR to HDR-TSP which can be three times faster, while using essentially the same hardware. In general, the SDR protocol manipulates bytes, whereas the HDR protocols work with two-byte words.

In conventional use, CCCs are transferred over the I3C bus using the SDR protocol. In order to transmit CCCs, the master and slave devices are configured for SDR mode and the CCCs are transmitted at the lower data rate in order to support coexistence between high-speed and low-speed devices on the I3C bus. In SDR modes the CCCs have a length of 1 byte (8 bits) and are transmitted with a transition bit (T-bit) which may be configured to serve as a parity check bit.

Figure 11:
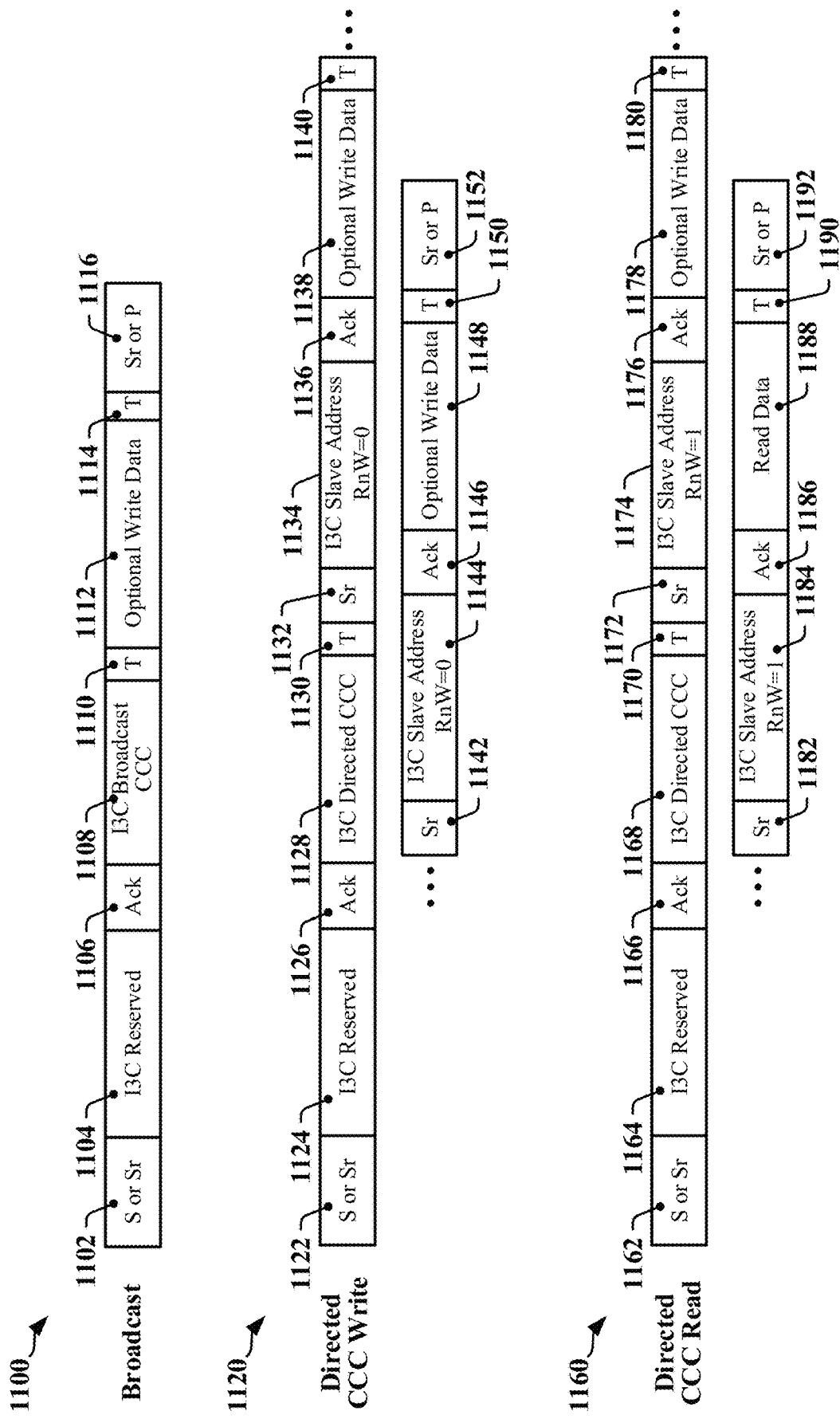
FIG. 11 illustrates examples of CCC transmissions over a serial data link configured to support one or more I3C modes of operation.

FIG. 11 illustrates examples of CCC transmissions over a serial data link configured to support one or more I3C modes of operation. The CCC transmission occurs in SDR mode, and the CCC is preceded by the transmission of an I3C reserved byte, which is defined as {7'h7E, RnW=0}.

The first example relates to a CCC broadcast 1100. The CCC broadcast 1100 is initiated by transmitting a start or repeated start 1102 followed by a reserved I3C word 1104.

If an acknowledgement 1106 is received, an I3C CCC command 1108 may be transmitted followed by a T-bit 1110. The I3C CCC command 1108 may be up to 8 bits in length. When the I3C CCC command 1108 is a write command, write data 1112 may be transmitted with a T-bit 1114. The CCC broadcast 1100 is terminated when a repeated start or stop 1116 is transmitted.

The second example relates to a CCC directed write 1120. The CCC directed write 1120 is initiated by transmitting a start or repeated start 1122 followed by a reserved I3C word 1124. If an acknowledgement 1126 is received, an I3C CCC directed command 1128 may be transmitted followed by a T-bit 1130. The I3C CCC directed command 1128 may be up to 8 bits in length. Data may then be transmitted. Each data payload commences with a repeated start 1132, 1142 followed by an I3C slave address 1134, 1144 with the read/not-write (RnW) bit set to 0 to indicate a write operation. Upon receiving an acknowledgement 1136, 1146, write data 1138, 1148 may optionally be transmitted with a T-bit 1140, 1150. The CCC directed write 1120 is terminated with transmission of a repeated start or stop 1152.

The third example relates to a CCC directed read 1160. The CCC directed read 1160 is initiated by transmitting a start or repeated start 1162 followed by a reserved I3C word 1164. If an acknowledgement 1166 is received, an I3C CCC directed command 1168 may be transmitted followed by a T-bit 1170. The I3C CCC directed command 1168 may be up to 8 bits in length. Data may then be read from a slave device. Each data payload commences with a repeated start 1172, 1182 followed by an I3C slave address 1174, 1184 with the RnW bit set to 1 to indicate a read operation. Upon receiving an acknowledgement 1176, 1186, read data 1178, 1188 may be received with a T-bit 1180, 1190. The CCC directed read 1160 is terminated with transmission of a repeated start or stop 1192.

Figure 12:
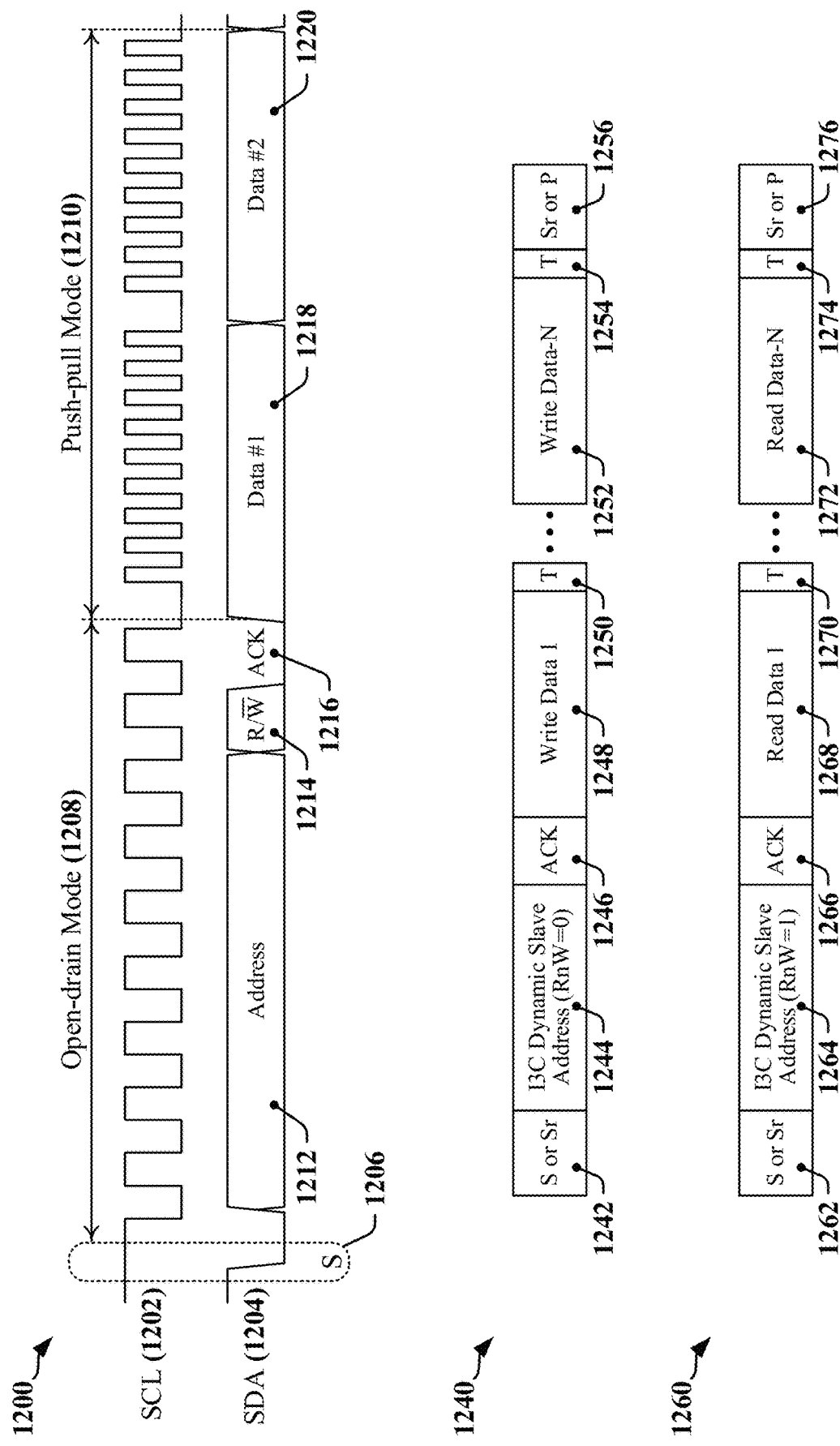
FIG. 12 illustrates certain aspects of I3C SDR transactions.

FIG. 12 illustrates certain aspects of I3C SDR transactions. A timing diagram 1200 illustrates two phases of an I3C transaction, where each phase is defined by a mode of operation of line drivers in devices that are participants to the transaction. Address 1212 and other information is transmitted while the line drivers are operating in open-drain mode 1208 in an address phase, and data bytes 1218, 1220 are transmitted while the line drivers are operating in push-pull mode 1210. A transaction commences after signaling corresponding to a start condition 1206 is transmitted on SCL 1202 and SDA 1204. The master device transmits the address 1212 of a slave device in an open-drain mode 1208. In the illustrated example, the slave address is a dynamic address allocated to a slave and has a value other than the 7'h7E value reserved for CCC transmissions. The clock signal transmitted on SCL 1202 during open-drain mode 1208 has a frequency that meets I2C limits and tolerances. The address 1212 is followed by a read/write bit 1214 transmitted by setting SDA 1204 to logic high to indicate a read transaction and to logic low to indicate a write transaction. A slave device responds with an acknowledgement (ACK 1216) by driving SDA 1204 low. In the data phase, one or more data bytes 1218, 1220 are transmitted on SDA 1204 in an I3C push-pull mode 1210 and commencing to or from the location identified by the address 1212. The clock signal transmitted on SCL 1202 may have an increased frequency according to I3C protocols in the data phase.

The timing diagram 1200 may be a private write transaction 1240 or a private read transaction 1260, as determined by the value of the read/write bit 1214. Each transaction 1240, 1260 commences with a START condition or repeated Start 1242, 1262 followed by a 7-bit address field 1244, 1264, a read/write bit 1214 and an ACK/NACK 1246, 1266. The master device may transmit one or more data bytes 1248, 1252 and corresponding T-bits 1250, 1254 in the write transaction 1240. The slave device transmits one or more data bytes 1268, 1272 and corresponding T-bits 1270, 1274 in the read transaction 1260. Each transaction 1240, 1260 is terminated by a STOP condition or repeated Start 1256, 1276.

The address phase consumes nine cycles of the clock signal transmitted on SCL 1202 in the open-drain mode 1208. The address information includes the 7-bit address field 1244, 1264, a read/write bit 1214 and an ACK/NACK 1246, 1266. Fields carrying data bytes 1218, 1220 consume nine cycles of the clock signal transmitted on SCL 1202 in the I3C push-pull mode 1210. An unlimited number of data bytes 1248, 1252, 1268, 1272 may be transmitted. Each data bytes 1248, 1252, 1268, 1272 is followed in transmission by a T-bit 1250, 1254, 1270, 1274. The address phase endures for at least 9 µs and constitutes a significantly large overhead that can impact performance in short data transactions.

Figure 13:
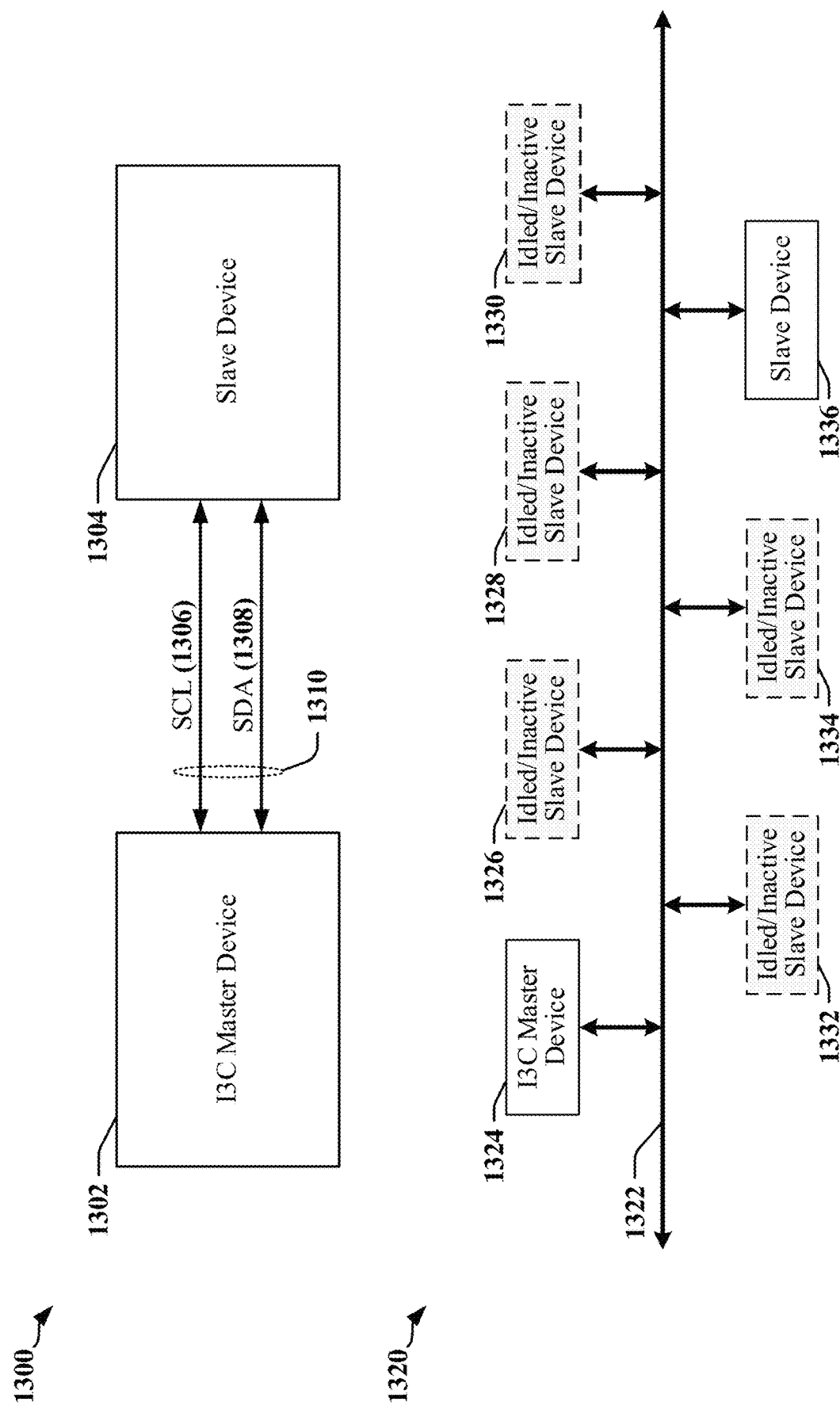
FIG. 13 illustrates examples of point-to-point topologies in accordance with certain aspects disclosed herein.

Certain aspects of this disclosure provide a point-to-point topology in which address overhead can be significantly reduced. FIG. 13 illustrates examples 1300, 1320 of point-to-point topologies. In the first example 1300, a master device 1302 is exclusively coupled to a slave device 1304 using point-to-point SCL 1306 and SDA 1308 lines. Exclusive coupling may be employed to provide a secure I3C serial bus 1310 between the two devices 1302, 1304, to improve available bandwidth for transactions executed between the two devices 1302, 1304, and/or to provide a low-latency channel for high-priority traffic transmitted between the two devices 1302, 1304. The slave device 1304 may be a secondary master device capable of controlling operation of the I3C serial bus 1310 and/or initiating transactions on the I3C serial bus 1310. A secondary master device may obtain control of the I3C serial bus 1310 using in-band interrupts and an address arbitration procedure.

In the second example 1320, an opportunistic point-to-point link is provided between the master device 1324 and a slave device 1336 coupled through a serial bus 1322 when other slave devices 1326, 1328, 1330, 1332, 1334 are idled, disabled, disconnected or otherwise inactive on the serial bus 1322. The master device may detect or determine that only one slave device 1336 is active on the serial bus 1322 and may configure the slave device 1336 for point-to-point mode to improve available bandwidth for transactions executed between the two devices 1324, 1336, and/or to reduce latency for high-priority traffic transmitted between the two devices 1324, 1336. The slave device 1336 may be a secondary master device capable of controlling operation of the I3C bus 1322 and/or initiating transactions on the I3C bus 1322.

Transaction overhead may be reduced by truncating certain address information when two devices communicate over a point-to-point link. A master device does not need to identify a slave device when initiating a transaction because only one slave device is available on the point-to-point link. Accordingly, the device address field defined by I3C protocols may be replaced by an address field that serves only to select between a private read/write transaction and a CCC transaction. I3C protocols specify that a slave device identifier is transmitted for direct transactions and the I3C reserved byte (7'h7E) is transmitted during a CCC transaction.

According to certain aspects of the disclosure, a master device 1302 or 1324 may configure a slave device 1304 or 1336 for a modified command structure that truncates or otherwise reduces the size of the device address field when the master device 1302 or 1324 has detected or determined that only one slave device 1304 or 1336 is active on the serial bus 1310 or 1322.

Figure 14:
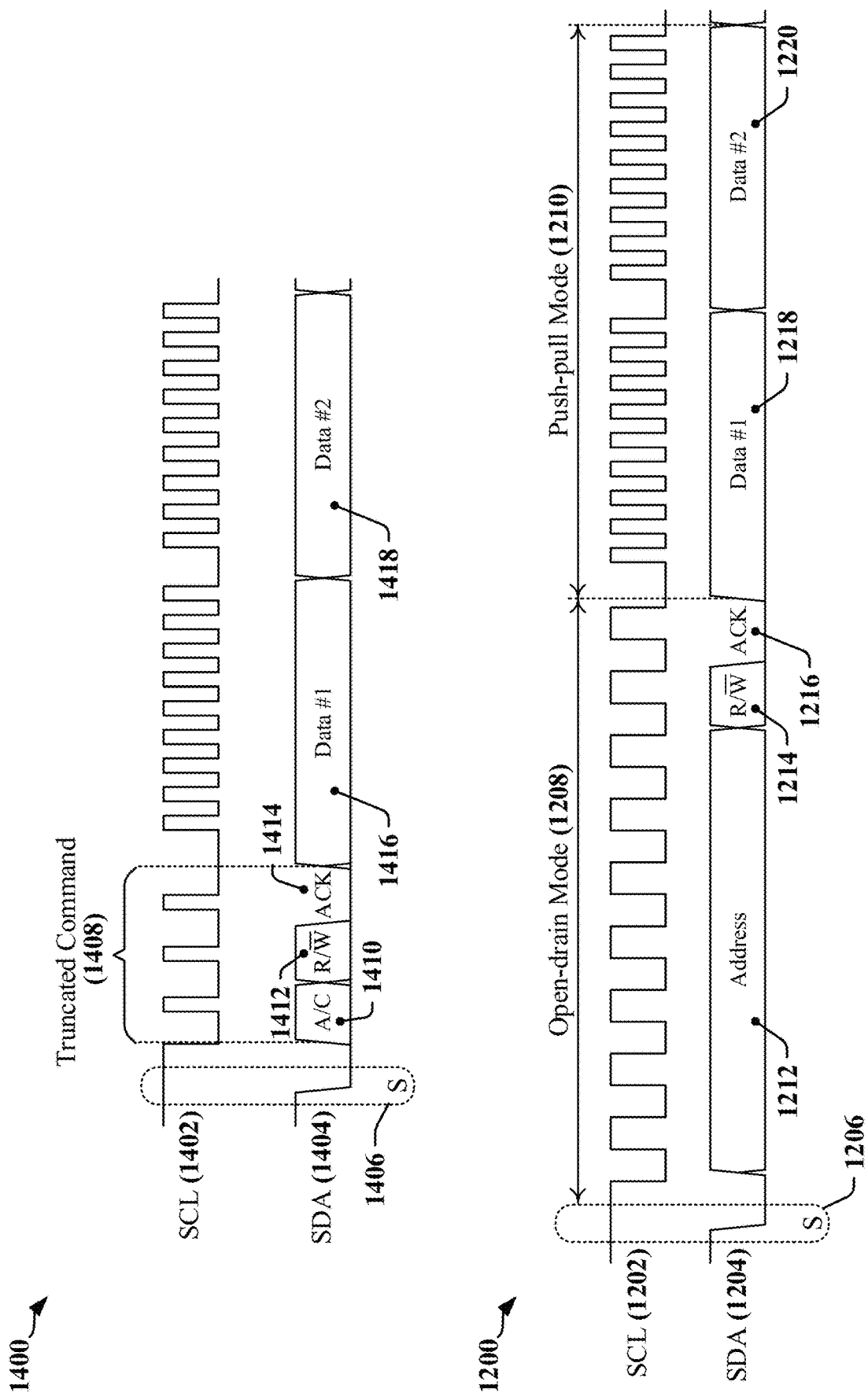
FIG. 14 illustrates an example of a transaction modified in accordance with certain aspects disclosed herein.

FIG. 14 illustrates an example of a transaction 1400 modified in accordance with certain aspects disclosed herein. The timing diagram 1200 of FIG. 12 corresponding to a conventional transaction is reproduced in FIG. 14 to aid comparison. The modified transaction 1400 may be available for use when a capable slave device is coupled to a master device using a point-to-point link operated in a point-to-point mode in accordance with modified or adapted I3C protocols disclosed herein. In some instances, the master device may enable and/or disable the point-to-point mode by transmitting a command to the slave device.

The master device may transmit short commands to the slave device when the point-to-point mode is enabled. The short commands may use a truncated command field 1408 that follows a START condition 1406 provided on SCL 1402 and SDA 1404. The truncated command field 1408 carries a one-bit address 1410, a read/write bit 1412 and an ACK/NACK 1414. The one-bit address 1410 indicates whether the transaction 1400 is data read or write transaction or a CCC transaction. In one example, the one-bit address 1410 is set to '0' to indicate that a private read or write is to be performed in a point-to-point transaction 1400, and the one-bit address 1410 is set to '1' to indicate that the transaction 1400 is a CCC transaction. In the latter example, the master device provides a 1-bit field having a first value as a substitute for the 7-bit address of the slave device or having a second value as a substitute for the I3C reserved byte (7'h7E). The substitution of the 1-bit field saves six clock cycles at the lower-frequency open-drain clock rate. The use of a truncated command field 1408 in a point-to-point topology can reduce the address phase overhead from 9 bits to 3 bits.

Further improvements in address phase overhead can be obtained by configuring line drivers for push-pull mode in the address phase. Push-pull mode may be used to transmit a truncated command field 1408 when the master device has determined that it is coupled to a single slave device that is configured for communicating using I3C protocols.

Data 1416, 1418 may be transmitted in bytes when I3C SDR protocols are used in the transaction 1400 conducted over a point-to-point link. Data 1416, 1418 may be transmitted in 16-bit words when I3C HDR-DDR protocols are used in the transaction 1400 conducted over a point-to-point link. No change in HDR-DDR word format is needed for use on the point-to-point link.

In some implementations, dynamic address allocation procedures can be omitted. The slave device may be preconfigured for point-to-point mode before commencement of normal I3C communication. A dynamic address is not needed or used in the point-to-point mode.

Figure 15:
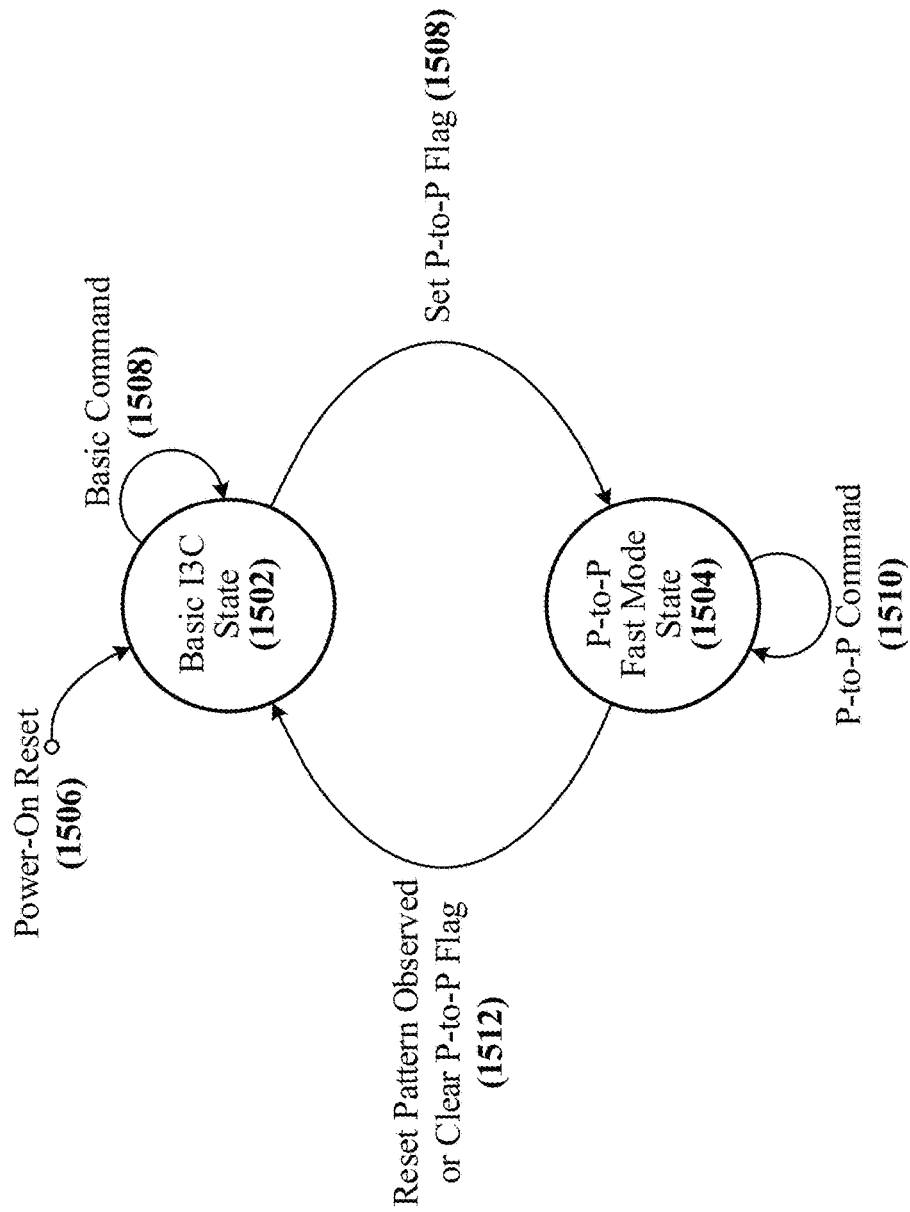
FIG. 15 is an example of a state diagram representing the control of operating state of a slave device configured in accordance with certain aspects disclosed herein.

In certain implementations, a slave device may be capable of switching between basic I3C multi-drop mode of operation and a point-to-point mode of operation. A mode-switchable slave device may include a finite state machine, a processor, sequential logic and/or combinational logic that is configured to manage operating state of the slave device. FIG. 15 is an example of a state diagram 1500 representing the control of operating state of the slave device. The slave device may enter a basic I3C state 1502 after a power-on reset 1506 or another reset event. In the illustrated example, the slave device may respond to commands 1508 in accordance with conventional I3C protocols while remaining in the basic I3C state 1502. The master device may use a first write command 1508 to set a register value or flag that indicates point-to-point mode is enabled when set. When the first write command 1508 is executed and acknowledged, the slave device may enter a fast I3C state 1504 in which a point-to-point mode of operation is activated. The slave device may respond to commands 1510 in accordance with modified I3C protocols while remaining in the fast I3C state 1504. The master device may use a second write command 1512 to clear the register value or flag indicating that the point-to-point mode is disabled. In some instances, the slave device returns to the basic I3C state 1502 in response to a reset triggered by the master device or after an error condition is detected in the slave device. A reset may be triggered when the slave device recognizes a reset pattern on the data link.

Figure 16:
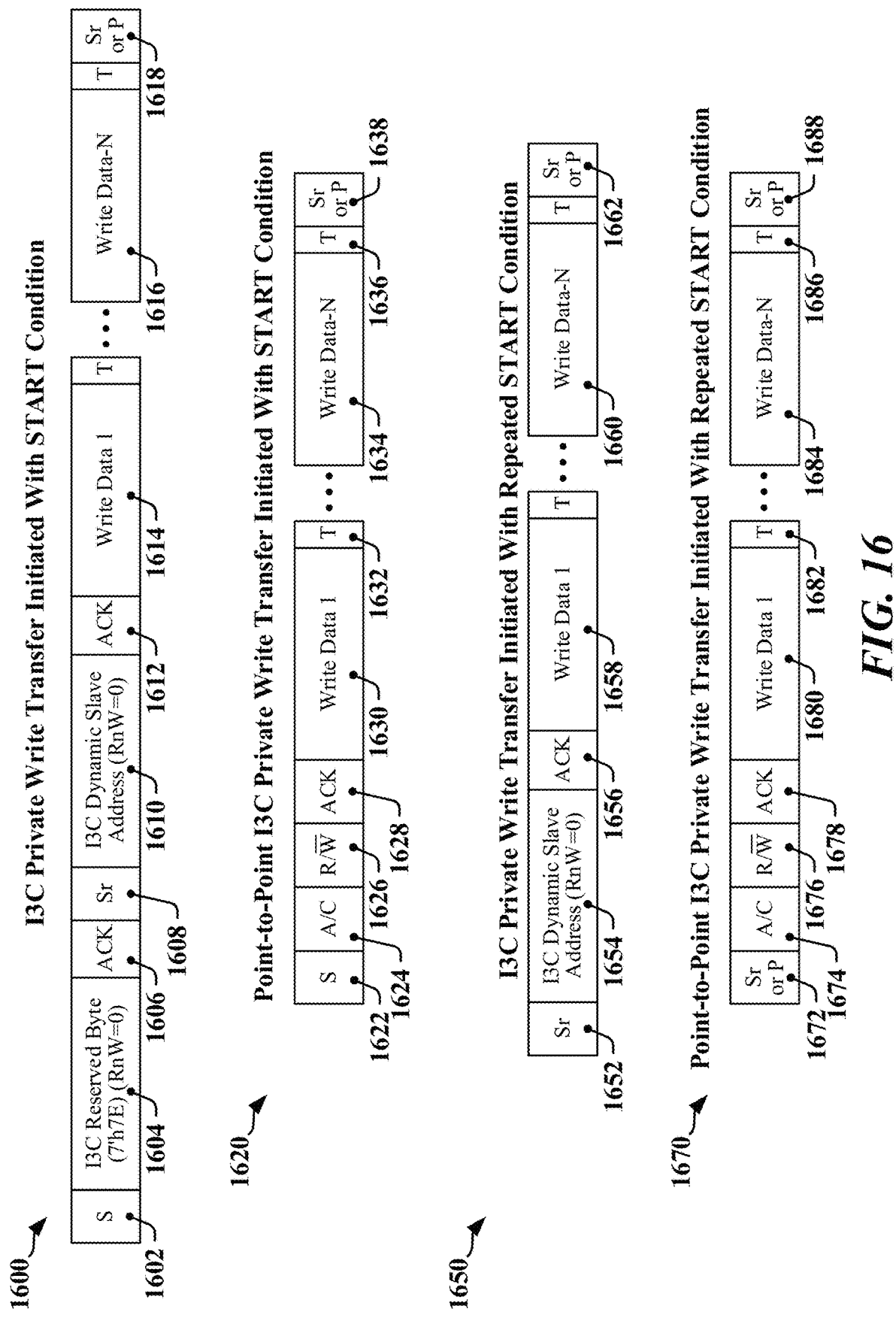
FIG. 16 illustrates basic I3C private write transfers and a corresponding point-to-point I3C private write transfers provided in accordance with certain aspects disclosed herein.

FIG. 16 illustrates basic I3C private write transfers 1600, 1650 and a corresponding point-to-point I3C private write transfers 1620, 1670. The first basic I3C private write transfer 1600 commences with a START condition 1602 followed by a command 1604 that includes an I3C reserved byte and read/write bit that has been cleared to zero. After receiving an acknowledgement 1606, the master device transmits a repeated START 1608 followed by a command 1610 that includes a dynamic slave address and read/write bit that has been cleared to '0' to indicate a write command. After receiving an acknowledgement 1612, the master device transmits one or more data bytes 1614, 1616 terminated by a repeated START or STOP condition 1618.

The first point-to-point I3C private write transfer 1620 commences with a START condition 1622 followed by a one-bit address 1624 configured with a value that indicates a private transaction. The one-bit address 1624 is followed by read/write bit 1626 that has been cleared to '0' to indicate a write command. After receiving an acknowledgement 1628, the master device transmits one or more data bytes 1630, 1634 terminated by a repeated START or STOP condition 1638. Each data byte 1630, 1634 is transmitted with a transition bit 1632, 1636.

The second basic I3C private write transfer 1650 commences with a repeated START condition 1652 followed by a command 1654 that includes a dynamic slave address and read/write bit that has been cleared to '0' to indicate a write command. After receiving an acknowledgement 1656, the master device transmits one or more data bytes 1658, 1660 terminated by a repeated START or STOP condition 1662.

The second point-to-point I3C private write transfer 1670 commences with a START condition 1672 followed by a one-bit address 1674 configured with a value that indicates a private transaction. The one-bit address 1674 is followed by read/write bit 1676 that has been cleared to '0' to indicate a write command. After receiving an acknowledgement 1678, the master device transmits one or more data bytes 1680, 1684 terminated by a repeated START or STOP condition 1688. Each data byte 1680, 1684 is transmitted with a transition bit 1682, 1686.

Figure 17:
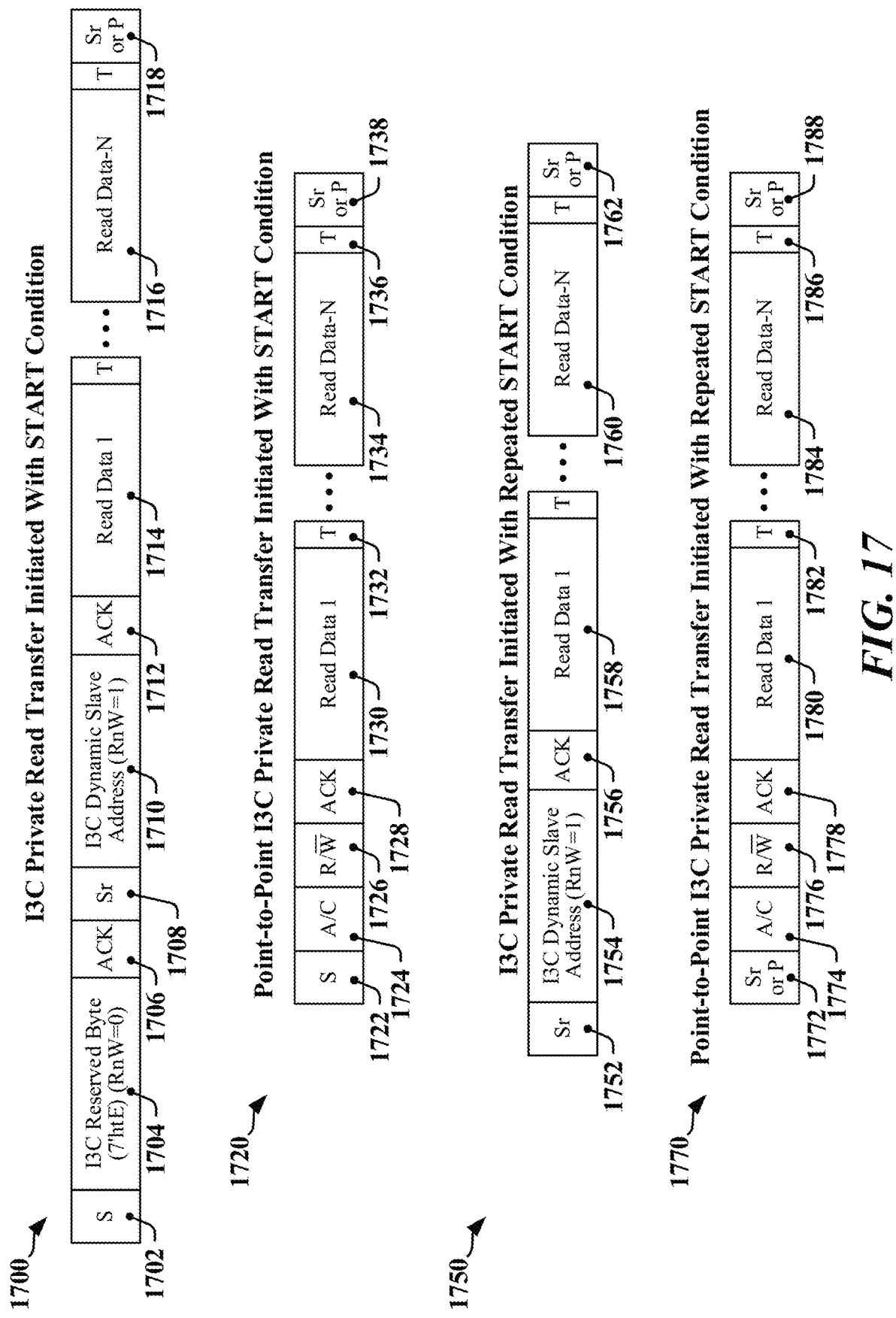
FIG. 17 illustrates basic I3C private read transfers and a corresponding point-to-point I3C private write transfers provided in accordance with certain aspects disclosed herein.

FIG. 17 illustrates basic I3C private read transfers 1700, 1750 and a corresponding point-to-point I3C private write transfers 1720, 1770. The first basic I3C private write transfer 1700 commences with a START condition 1702 followed by a command 1704 that includes an I3C reserved byte and read/write bit that has been cleared to zero. After receiving an acknowledgement 1706, the master device transmits a repeated START 1708 followed by a command 1710 that includes a dynamic slave address and read/write bit that has been set to '1' to indicate a read command. After transmitting an acknowledgement 1712, the slave device transmits one or more data bytes 1714, 1716 terminated by a repeated START or STOP condition 1718.

The first point-to-point I3C private read transfer 1720 commences with a START condition 1722 followed by a one-bit address 1724 configured with a value that indicates a private transaction. The one-bit address 1724 is followed by read/write bit 1726 that has been set to '1' to indicate a read command. After receiving an acknowledgement 1728, the slave device transmits one or more data bytes 1730, 1734 terminated by a repeated START or STOP condition 1738. Each data byte 1730, 1734 is transmitted with a transition bit 1732, 1736.

The second basic I3C private read transfer 1750 commences with a repeated START condition 1752 followed by a command 1754 that includes a dynamic slave address and read/write bit that has been set to '1' to indicate a read command. After transmitting an acknowledgement 1756, the slave device transmits one or more data bytes 1758, 1760 terminated by a repeated START or STOP condition 1762.

The second point-to-point I3C private read transfer 1770 commences with a START condition 1772 followed by a one-bit address 1774 configured with a value that indicates a private transaction. The one-bit address 1774 is followed by read/write bit 1776 that has been set to '1' to indicate a read command. After receiving an acknowledgement 1778, the slave device transmits one or more data bytes 1780, 1784 terminated by a repeated START or STOP condition 1788. Each data byte 1780, 1784 is transmitted with a transition bit 1782, 1786.

FIG. 18 illustrates a basic I3C Directed CCC Write transaction 1800 and a corresponding point-to-point I3C Directed CCC Write transaction 1850. The basic I3C Directed CCC Write transaction 1800 commences with a START condition or repeated START 1802 followed by a command 1804 that includes an I3C reserved byte and read/write bit that has been cleared to zero. After receiving an acknowledgement 1806, the master device transmits an I3C Directed CCC code 1808 with a T-bit appended. The master device may transmit a first command 1812 preceded by a repeated START 1810. The first command 1812 includes a dynamic slave address and read/write bit that has been cleared to '0' to indicate a write command. After receiving an acknowledgement 1814, the master device may transmit write data 1816 with a T-bit appended. The master device may transmit one or more additional commands 1820, each preceded by a repeated START 1818. Each additional command 1820 includes a dynamic slave address and read/write bit that has been cleared to '0' to indicate a write command. After receiving an acknowledgement 1822, the master device may transmit write data 1824 with a T-bit appended. The basic I3C Directed CCC Write transaction 1800 may be terminated by a repeated START or STOP condition 1826.

The point-to-point I3C Directed CCC Write transaction 1850 commences with a START condition or repeated START 1852 followed by a one-bit address 1854 set to indicate a private transaction. The one-bit address 1854 is followed by read/write bit 1856 that has been cleared to '0' to indicate a write command. After receiving an acknowledgement 1858, the master device transmits an I3C Directed CCC code 1860 with a T-bit appended. The master device may initiate a first directed write by transmitting a repeated START 1862, a one-bit address 1864 set to indicate a private transaction and a read/write bit 1866 that has been cleared to '0' to indicate a write command. After receiving an acknowledgement 1868, the master device may transmit write data 1870, 1880 with a T-bit appended. The master device may initiate one or more additional directed writes. Each directed write may be initiated by transmitting a repeated START 1872, a one-bit address 1874 set to indicate a private transaction and a read/write bit 1876 that has been cleared to '0' to indicate a write command. After receiving an acknowledgement 1878, the master device may transmit write data 1870, 1880 with a T-bit appended. The point-to-point I3C Directed CCC Write transaction 1850 may be terminated by a repeated START or STOP condition 1882.

FIG. 19 illustrates a basic I3C Directed CCC Read transaction 1900 and a corresponding point-to-point I3C Directed CCC Read transaction 1950. The basic I3C Directed CCC Read transaction 1900 commences with a START condition or repeated START 1902 followed by a command 1904 that includes an I3C reserved byte and read/write bit that has been cleared to zero. After receiving an acknowledgement 1906, the master device transmits an I3C Directed CCC code 1908 with a T-bit appended. The master device may transmit a first command 1912 preceded by a repeated START 1910. The first command 1912 includes a dynamic slave address and read/write bit that has been set to '1' to indicate a read command. After transmitting an acknowledgement 1914, the slave device may transmit read data 1916 with a T-bit appended. The master device may transmit one or more additional commands 1920, each preceded by a repeated START 1918. Each additional command 1920 includes a dynamic slave address and read/write bit indicating a read command. After transmitting an acknowledgement 1922, the slave device may transmit read data 1924 with a T-bit appended. The basic I3C Directed CCC Read transaction 1900 may be terminated by a repeated START or STOP condition 1926.

The point-to-point I3C Directed CCC Read transaction 1950 commences with a START condition or repeated START 1952 followed by a one-bit address 1954 set to indicate a private transaction. The one-bit address 1954 is followed by read/write bit 1956 that has been set to '1' to indicate a read command. After receiving an acknowledgement 1958, the master device transmits an I3C Directed CCC code 1960 with a T-bit appended. The master device may initiate a first directed read by transmitting a repeated START 1962, a one-bit address 1964 set to indicate a private transaction and a read/write bit 1966 that indicates a read command. After transmitting an acknowledgement 1968, the slave device may transmit read data 1970, 1980 with corresponding T-bits appended. The master device may initiate one or more additional directed reads. Each directed read may be initiated by transmitting a repeated START 1972, a one-bit address 1974 set to indicate a private transaction and a read/write bit 1976 that that has been set to '1' to indicate a read command. After transmitting an acknowledgement 1978, the slave device may transmit read data 1970, 1980 with T-bits appended. The point-to-point I3C Directed CCC Read transaction 1950 may be terminated by a repeated START or STOP condition 1982.

Certain overhead associated with I3C in-band interrupt procedures (MI procedures) may be reduced by when two devices communicate over a point-to-point link in accordance with certain aspects of the disclosure. On a multidrop serial bus operated in accordance with I3C protocols, one or more slave devices may request service and/or control of the multidrop serial bus by asserting an in-band interrupt and participating in an arbitration procedure. When a point-to-point link is used to couple a pair of devices, one device serves as a master device and another serves as a slave device on the bus in any transaction. The slave device may request termination of a transaction by asserting an in-band interrupt when, for example, high-priority or low-latency data becomes available for transfer from the slave device to the master device. In some implementations, both devices coupled to a point-to-point link may be operable as bus masters and the current slave device may request transfer of control of the point-to-point link by asserting an in-band interrupt.

FIG. 20 illustrates a basic I3C IBI procedure 2000 and an example of a corresponding modified point-to-point I3C IBI procedure 2050. In the basic I3C IBI procedure 2000, a device other than the current bus master may assert an in-band interrupt during transmission of certain address fields to initiate an arbitration process that enables the asserting device to request access to, and/or gain control of a serial bus. The serial bus may be operated in a mode in which an arbitrable address header 2004 is transmitted on a data line in accordance with timing provided by a clock signal transmitted on a clock line. The arbitrable address header 2004 is transmitted after a START condition 2002, both transmitted when the serial bus is operated in an open-drain mode. A slave device may assert an in-band interrupt by driving its address on SDA. The master device recognizes the in-band interrupt when it detects that SDA has been driven low by another device. The slave device with the lowest address wins the arbitration process and, by protocol, other slave devices withdraw from the IBI procedure after detecting that SDA has been low by another device. The master device acknowledges the in-band interrupt by providing an acknowledgement 2006 while the bus is in open-drain mode. The master device may initiate an in-band interrupt service procedure to determine the nature of the service requested by the slave device. In one example, the master device may disable its line driver coupled to SDA during a hand-off period 2008 when the clock signal is held in a high logic state. The slave device enables push-pull mode for its line driver coupled to SDA during the hand-off period 2008 and transmits a data byte 2010 that is followed by a T-bit 2012. The master device may determine the nature of the in-band interrupt request based on configuration information read from the slave device, content of the data byte 2010 and/or from other configuration information. The T-bit 2012 is provided when the slave device drives SDA high or low before causing the output of its line driver to enter a high-impedance state. The current master device may then provide a repeated START 2014.

In the modified point-to-point I3C IBI procedure 2050, the slave device on a point-to-point link may assert an in-band interrupt during transmission of certain address fields to terminate a transaction in progress and/or to gain control of the point-to-point link. The serial bus may be operated in a mode in which the arbitrable address header 2004 in the basic I3C IBI procedure 2000 is replaced by a single-bit address 2054. The slave device may assert an in-band interrupt by driving SDA low during transmission of the single-bit address 2054. The single-bit address 2054 is transmitted after a START condition 2052, both transmitted when the serial bus is operated in an open-drain mode. The master device recognizes the in-band interrupt when it detects that SDA has been low by the slave device and may provide an acknowledgement 2056 while the bus is in open-drain mode. The master device then disables. The master device may initiate an in-band interrupt service procedure to determine the nature of the service requested by the slave device. In one example, the master device may disable its line driver coupled to SDA during a hand-off period 2058 when the clock signal is held in a high logic state. The slave device enables push-pull mode for its line driver coupled to SDA during the hand-off period 2058 and transmits a data byte 2060 that is followed by a T-bit 2062. The master device may determine the nature of the in-band interrupt request based on configuration information read from the slave device, content of the data byte 2010 and/or from other configuration information. The T-bit 2062 is provided when the slave device drives SDA high or low before causing the output of its line driver to enter a high-impedance state. The current master device may then provide a repeated START 2064.

Figure 21:
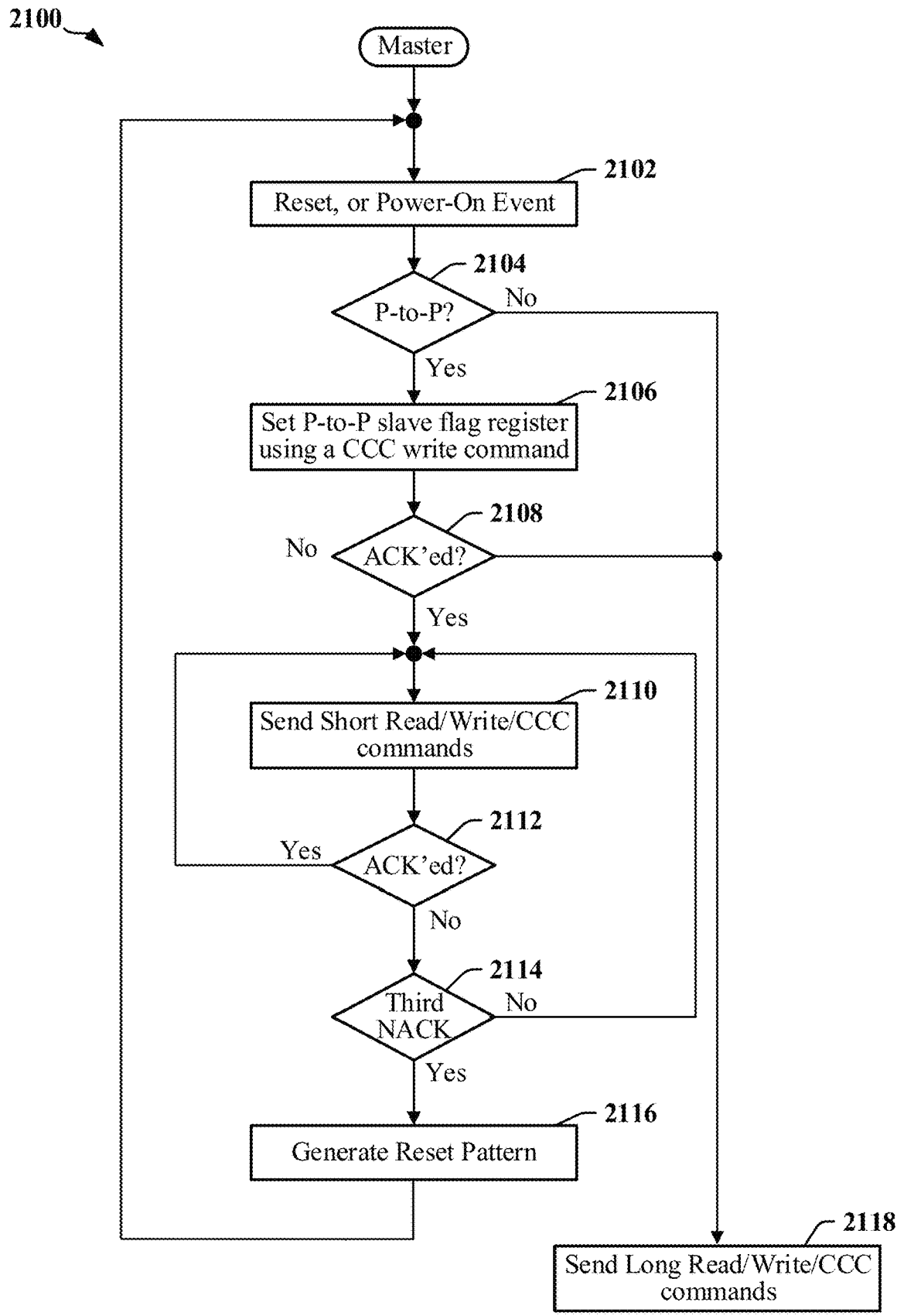
FIG. 21 is a first flowchart illustrating a bus management method performed at a master device that is a current manager of a serial bus.

FIG. 21 is a flowchart 2100 illustrating a bus management method performed at a master device that is a current manager of a serial bus. At block 2102, the master device may configure one or more devices coupled to the serial bus. Configuration may be performed after a system reset, or after a power-on event. In one example, the master device may assign dynamic addresses to slave devices coupled to the serial bus. In another example, the master device may configure parameters used for multidrop and/or point-to-point modes of operation.

At block 2104, the master device may determine whether a point-to-point mode of operation is to be initiated. In one example, the master may determine during configuration that only one slave device is coupled to the serial bus, effectively creating a point-to-point link. In another example, the master may disable all but one slave device, thereby establishing a point-to-point link. When the master device determines that a point-to-point mode of operation cannot be initiated, the master device may initiate one or more read or write transactions at block 2118 in accordance with conventional I3C protocols.

When the master device determines that a point-to-point mode of operation can be initiated, then at block 2106 the master device may set a point-to-point mode flag or register bit in the slave device that indicates operation in point-to-point mode. If, at block 2108, the master device has not received an acknowledgement from the slave device, the master device may proceed to block 2118 to initiate one or more read or write transactions in accordance with conventional I3C protocols. If the master device has not received an acknowledgement from the slave device at block 2108, then at block 2110 the master device may initiate one or more short read or write transactions in a point-to-point mode derived from, or based on I3C protocols. At block 2112, the master device may determine whether an acknowledgement has been received from the slave device for each short read or write transaction. The master device may initiate a next short read or write transaction at block 2110 when an acknowledgement has been received. When the master device determines that a negative acknowledgement has been received, including when the slave device provides no response, the master device may determine at block 2114 whether three consecutive negative acknowledgements have been received. If the master device determines that less than three consecutive negative acknowledgements have been received, the master device may retransmit the short read or write transaction at block 2110. If the master device determines that three consecutive negative acknowledgements have been received, the master device may generate and transmit a reset pattern at block 2116.

Examples of Processing Circuits and Methods

Figure 22:
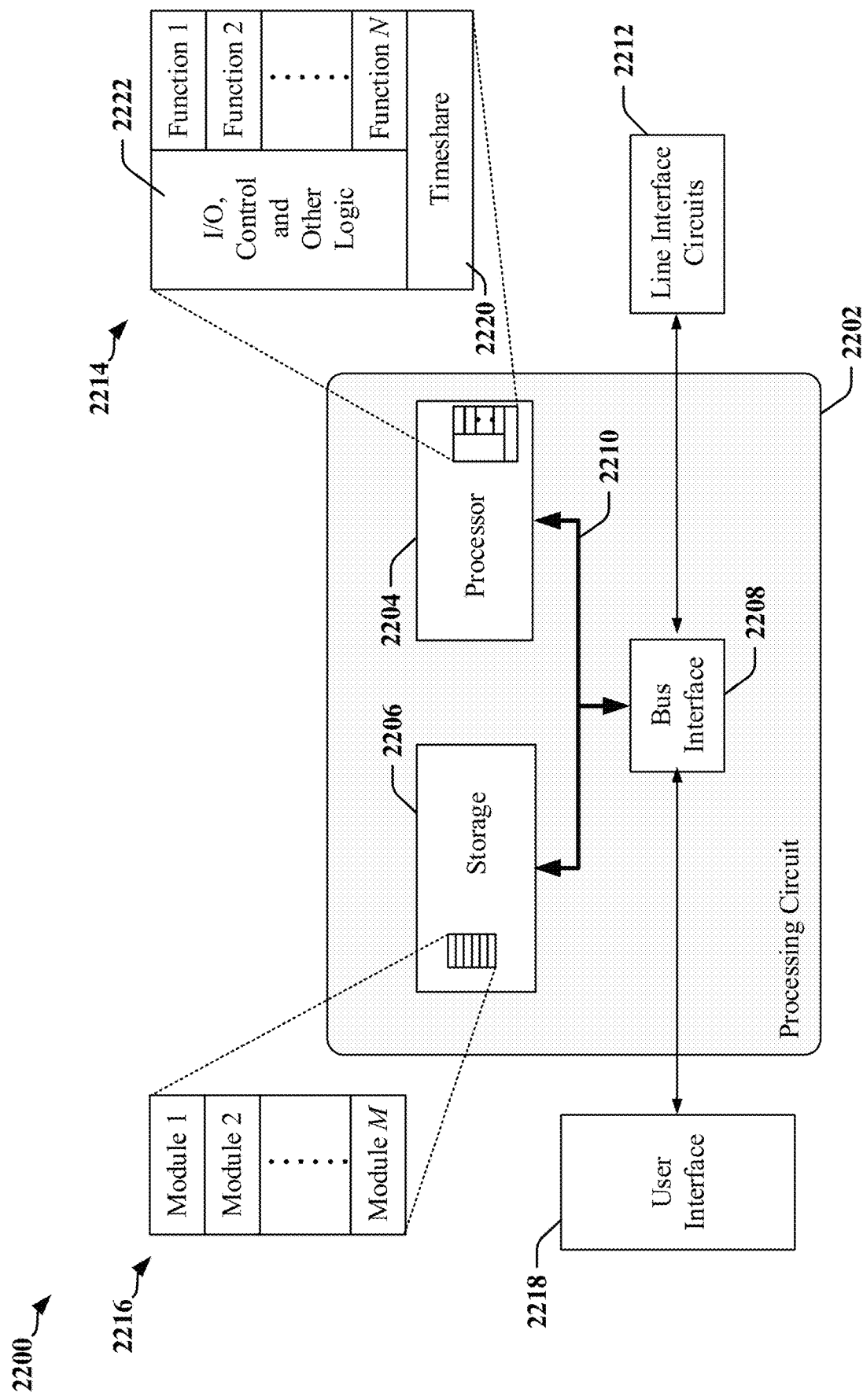
FIG. 22 is a block diagram illustrating an example of an apparatus employing a processing circuit that may be adapted according to certain aspects disclosed herein.

FIG. 22 is a diagram illustrating an example of a hardware implementation for an apparatus 2200 employing a processing circuit 2202 that may be configured to perform one or more functions disclosed herein. In accordance with various aspects of the disclosure, an element, or any portion of an element, or any combination of elements as disclosed herein may be implemented using the processing circuit 2202. The processing circuit 2202 may include one or more processors 2204 that are controlled by some combination of hardware and software modules. Examples of processors 2204 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 2204 may include specialized processors that perform specific functions, and that may be configured, augmented or controlled by one of the software modules 2216. The one or more processors 2204 may be configured through a combination of software modules 2216 loaded during initialization, and further configured by loading or unloading one or more software modules 2216 during operation. In various examples, the processing circuit 2202 may be implemented using a state machine, sequencer, signal processor and/or general-purpose processor, or a combination of such devices and circuits.

In the illustrated example, the processing circuit 2202 may be implemented with a bus architecture, represented generally by the bus 2210. The bus 2210 may include any number of interconnecting buses and bridges depending on the specific application of the processing circuit 2202 and the overall design constraints. The bus 2210 links together various circuits including the one or more processors 2204, and storage 2206. Storage 2206 may include memory devices and mass storage devices, and may be referred to herein as computer-readable media and/or processor-readable media. The bus 2210 may also link various other circuits such as timing sources, timers, peripherals, voltage regulators, and power management circuits. A bus interface 2208 may provide an interface between the bus 2210 and one or more transceivers 2212. A transceiver 2212 may be provided for each networking technology supported by the processing circuit. In some instances, multiple networking technologies may share some or all of the circuitry or processing modules found in a transceiver 2212. Each transceiver 2212 provides a means for communicating with various other apparatus over a transmission medium. Depending upon the nature of the apparatus 2200, a user interface 2218 (e.g., keypad, display, speaker, microphone, joystick) may also be provided, and may be communicatively coupled to the bus 2210 directly or through the bus interface 2208.

A processor 2204 may be responsible for managing the bus 2210 and for general processing that may include the execution of software stored in a computer-readable medium that may include the storage 2206. In this respect, the processing circuit 2202, including the processor 2204, may be used to implement any of the methods, functions and techniques disclosed herein. The storage 2206 may be used for storing data that is manipulated by the processor 2204 when executing software, and the software may be configured to implement any one of the methods disclosed herein.

One or more processors 2204 in the processing circuit 2202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2206 or in an external computer-readable medium. The external computer-readable medium and/or storage 2206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 2206 may also include, by way of example, a carrier wave, a transmission line, and any other suitable medium for transmitting software and/or instructions that may be accessed and read by a computer. Computer-readable medium and/or the storage 2206 may reside in the processing circuit 2202, in the processor 2204, external to the processing circuit 2202, or be distributed across multiple entities including the processing circuit 2202. The computer-readable medium and/or storage 2206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2206 may maintain software maintained and/or organized in loadable code segments, modules, applications, programs, etc., which may be referred to herein as software modules 2216. Each of the software modules 2216 may include instructions and data that, when installed or loaded on the processing circuit 2202 and executed by the one or more processors 2204, contribute to a run-time image 2214 that controls the operation of the one or more processors 2204. When executed, certain instructions may cause the processing circuit 2202 to perform functions in accordance with certain methods, algorithms and processes described herein.

Some of the software modules 2216 may be loaded during initialization of the processing circuit 2202, and these software modules 2216 may configure the processing circuit 2202 to enable performance of the various functions disclosed herein. For example, some software modules 2216 may configure internal devices and/or logic circuits 2222 of the processor 2204, and may manage access to external devices such as the transceiver 2212, the bus interface 2208, the user interface 2218, timers, mathematical coprocessors, and so on. The software modules 2216 may include a control program and/or an operating system that interacts with interrupt handlers and device drivers, and that controls access to various resources provided by the processing circuit 2202. The resources may include memory, processing time, access to the transceiver 2212, the user interface 2218, and so on.

One or more processors 2204 of the processing circuit 2202 may be multifunctional, whereby some of the software modules 2216 are loaded and configured to perform different functions or different instances of the same function. The one or more processors 2204 may additionally be adapted to manage background tasks initiated in response to inputs from the user interface 2218, the transceiver 2212, and device drivers, for example. To support the performance of multiple functions, the one or more processors 2204 may be configured to provide a multitasking environment, whereby each of a plurality of functions is implemented as a set of tasks serviced by the one or more processors 2204 as needed or desired. In one example, the multitasking environment may be implemented using a timesharing program 2220 that passes control of a processor 2204 between different tasks, whereby each task returns control of the one or more processors 2204 to the timesharing program 2220 upon completion of any outstanding operations and/or in response to an input such as an interrupt. When a task has control of the one or more processors 2204, the processing circuit is effectively specialized for the purposes addressed by the function associated with the controlling task. The timesharing program 2220 may include an operating system, a main loop that transfers control on a round-robin basis, a function that allocates control of the one or more processors 2204 in accordance with a prioritization of the functions, and/or an interrupt driven main loop that responds to external events by providing control of the one or more processors 2204 to a handling function.

Figure 23:
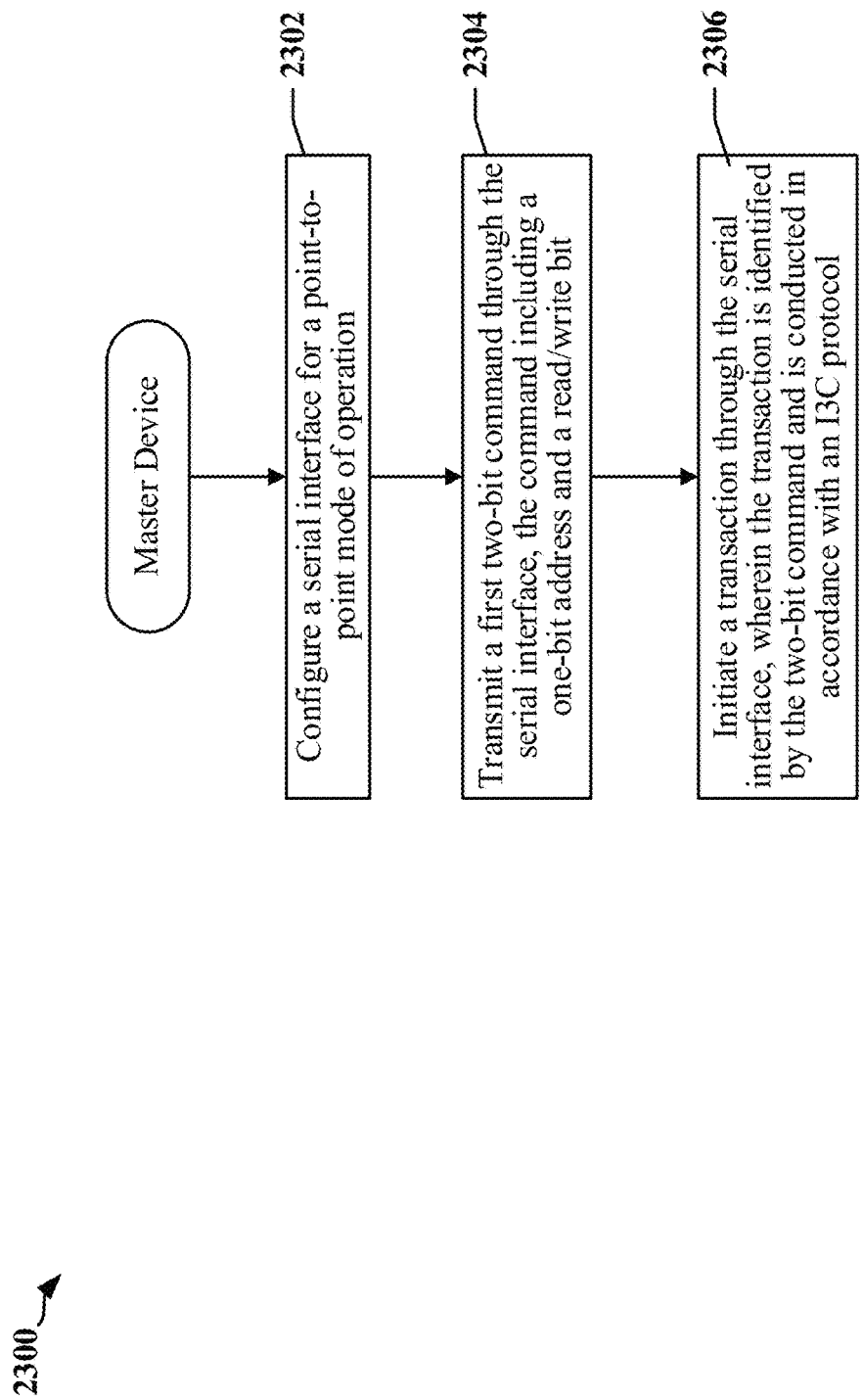
FIG. 23 is a second flowchart illustrating certain aspects of point-to-point communication at a master device in accordance with certain aspects disclosed herein.

FIG. 23 is a flowchart 2300 illustrating method for data communication that may be performed at a master device. The master device may be coupled to a serial bus through a serial interface. At block 2302, the master device may configure a serial interface for a point-to-point mode of operation. At block 2304, the master device may transmit a first two-bit command through the serial interface. The two-bit command may include a one-bit address and a read/write bit. At block 2306, the master device may initiate a transaction through the serial interface. The transaction may be identified by the two-bit command and may be conducted in accordance with an I3C protocol. For example, the transaction may include transmission of one or more data frames that are formatted in accordance with the I3C protocol. The master device may receive an acknowledgement from a slave device in response to the first two-bit command.

In some implementation, the master device may transmit an I3C CCC after transmitting the two-bit command when the one-bit address has a first value, and conduct a private transaction when the one-bit address has a second value. The read/write bit may select between a private read transaction and a private write transaction.

In certain implementations, the master device may initiate transmission of a second two-bit command through the serial interface after the transaction has been completed, and initiate an in-band interrupt service procedure when a data line of the serial interface is driven by a slave device before completion of transmission of the second two-bit command. The master device may transfer control of the serial interface to the slave device after completion of the interrupt service procedure.

In some implementations, the master device may identify a slave device coupled to the serial interface, determine that no other device is actively coupled to the serial interface, and configure one or more registers of the slave device to cause slave device to enter the point-to-point mode of operation. The master device may transmit a reset pattern through the serial interface. The reset pattern may be configured to cause the slave device to exit the point-to-point mode of operation.

Figure 24:
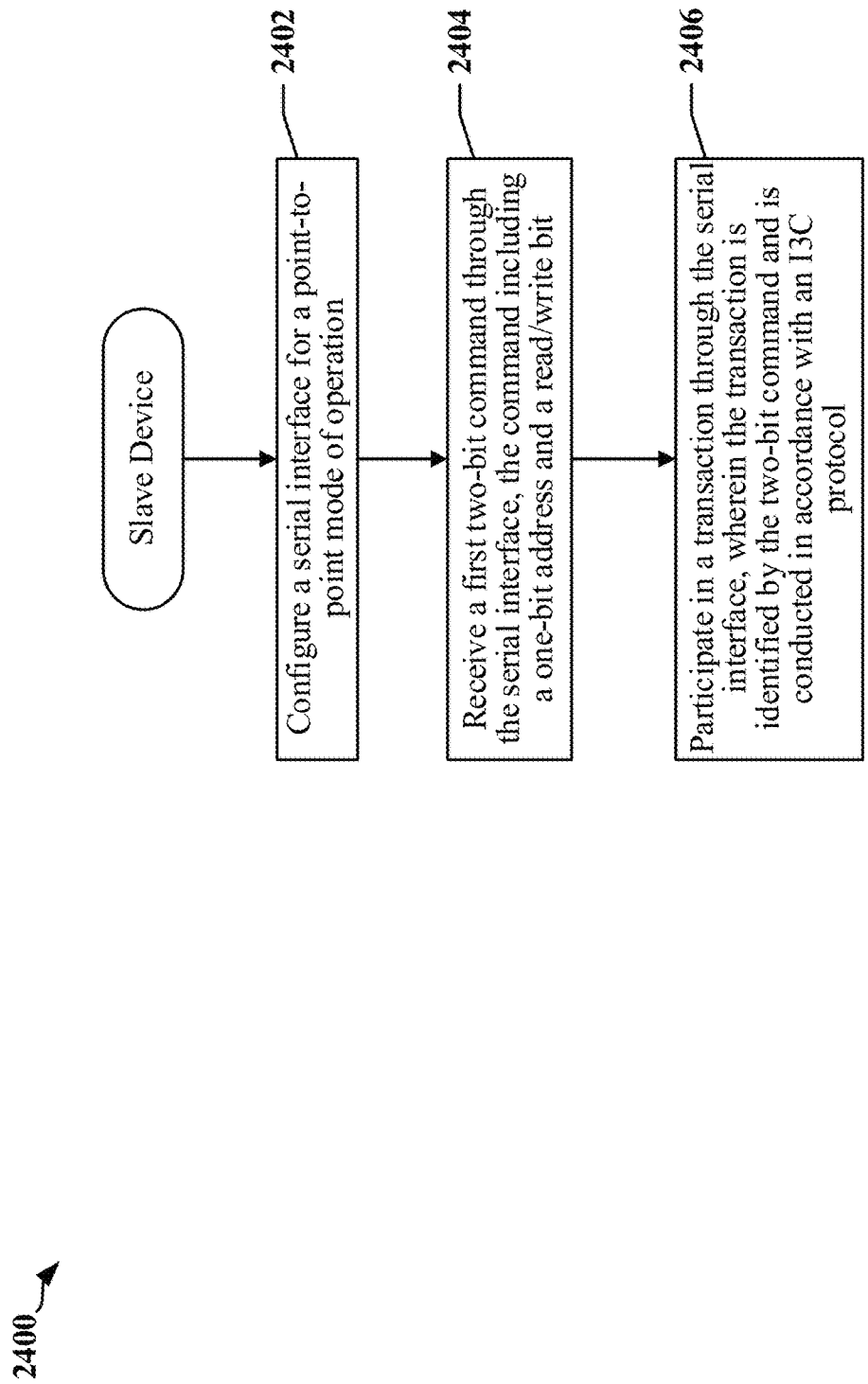
FIG. 24 is a third flowchart illustrating certain aspects of point-to-point communication at a master device in accordance with certain aspects disclosed herein.

FIG. 24 is a flowchart 2400 illustrating method for data communication that may be performed at a slave device. The slave device may be coupled to a serial bus through a serial interface. At block 2402, the slave device may configure a serial interface for a point-to-point mode of operation. At block 2404, the slave device may receive a first two-bit command through the serial interface. The two-bit command may include a one-bit address and a read/write bit. At block 2406, the slave device may participate in a transaction conducted through the serial interface. The transaction may be identified by the two-bit command and is conducted in accordance with an I3C protocol. In one example, the transaction includes one or more data frames formatted in accordance with the I3C protocol. The slave device may transmit an acknowledgement in response to the first two-bit command.

In some implementations, slave device may receive an I3C CCC after receiving the two-bit command when the one-bit address has a first value, and may participate in a private transaction when the one-bit address has a second value. The read/write bit may select between a private read transaction and a private write transaction.

In certain implementations, slave device may detect a START condition on the serial interface after the transaction has been completed, and drive a data line of the serial interface to request an in-band interrupt service procedure. The slave device may obtain control of the serial interface after completion of the interrupt service procedure.

In some instances, the slave device may detect a reset pattern in a signal received from the serial interface, and exiting the point-to-point mode of operation in response to the reset pattern.

Figure 25:
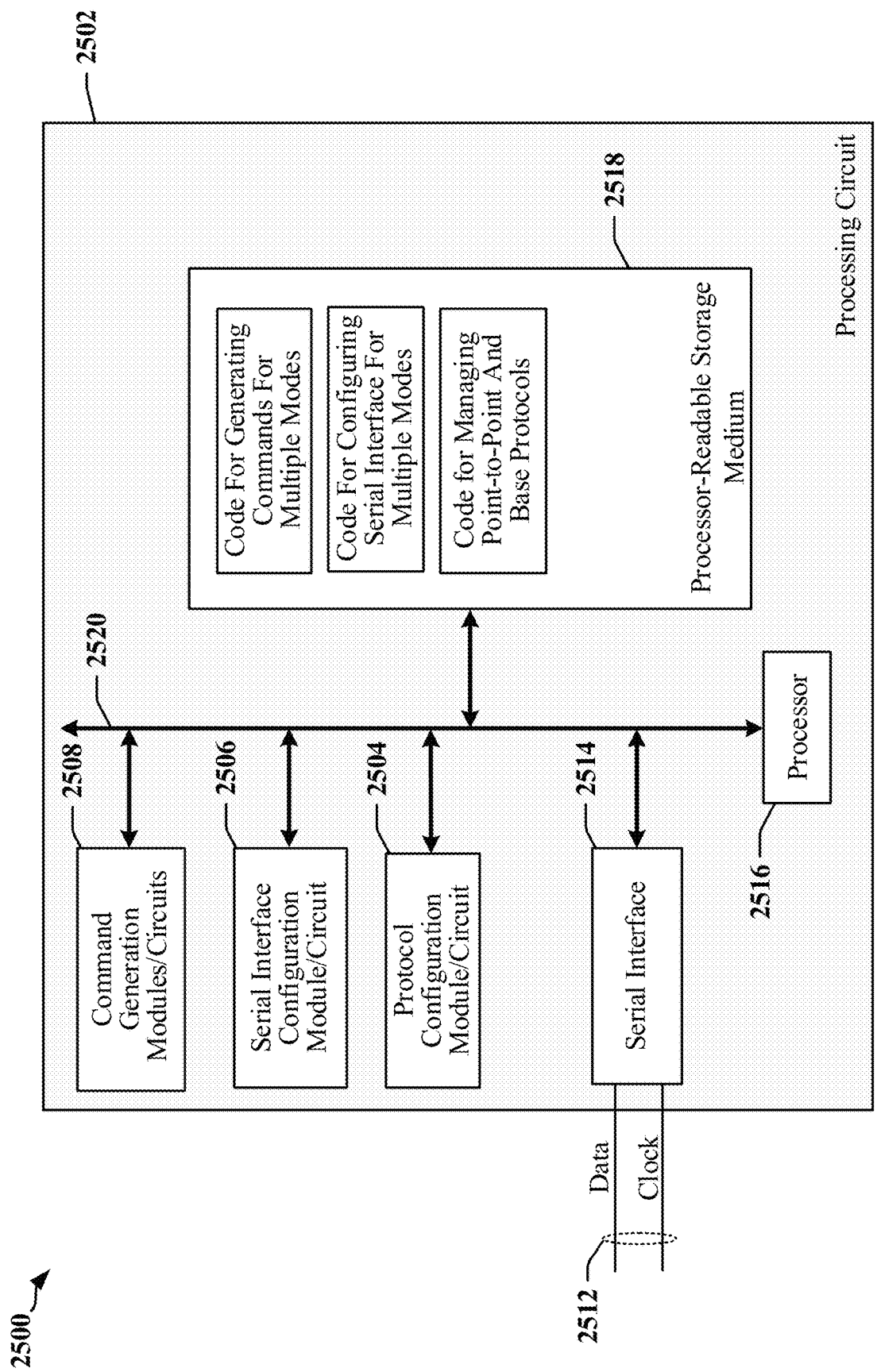
FIG. 25 illustrates a hardware implementation for an apparatus that supports point-to-point communication in accordance with certain aspects disclosed herein.

FIG. 25 is a diagram illustrating an example of a hardware implementation for an apparatus 2500 employing a processing circuit 2502. In one example, the apparatus 2500 is configured for operating as a master or slave device when communicating over a serial bus that is operated in accordance with one or more I3C protocols. The processing circuit typically has a controller or processor 2516 that may include one or more microprocessors, microcontrollers, digital signal processors, sequencers and/or state machines. The processing circuit 2502 may be implemented with a bus architecture, represented generally by the bus 2520. The bus 2520 may include any number of interconnecting buses and bridges depending on the specific application of the processing circuit 2502 and the overall design constraints. The bus 2520 links together various circuits including one or more processors and/or hardware modules, represented by the controller or processor 2516, the modules or circuits 2504, 2506 and 2508, and the processor-readable storage medium 2518. The apparatus may be coupled to a multi-wire serial link 2512 using a serial interface 2514. The serial interface 2514 may operate the multi-wire serial link 2512 to support communications in accordance with I3C protocols. The bus 2520 may also link various other circuits such as timing sources, peripherals, voltage regulators, and power management circuits, which are well known in the art, and therefore, will not be described any further.

The processor 2516 is responsible for general processing, including the execution of software, code and/or instructions stored on the processor-readable storage medium 2518. The computer-readable storage medium may include a non-transitory storage medium. The software, when executed by the processor 2516, causes the processing circuit 2502 to perform the various functions described supra for any particular apparatus. The computer-readable storage medium may be used for storing data that is manipulated by the processor 2516 when executing software. The processing circuit 2502 further includes at least one of the modules 2504, 2506 and 2508. The modules 2504, 2506 and 2508 may be software modules running in the processor 2516, resident/stored in the processor-readable storage medium 2518, one or more hardware modules coupled to the processor 2516, or some combination thereof. The modules 2504, 2506 and 2508 may include microcontroller instructions, state machine configuration parameters, or some combination thereof.

In one configuration, the apparatus 2500 includes a serial interface 2514 that may include one or more line driver circuits including a first line driver coupled to a first wire of a multi-wire serial bus and a second line driver coupled to a second wire of the multi-wire serial link 2512. In one example, the apparatus 2500 includes modules and/or circuits 2504 that selects and configures protocols to be used for communicating through the serial interface 2514, and modules and/or circuits 2506 that configures the serial interface 2514 to support the selected protocols, and modules and/or circuits 2504 configured to generate commands consistent with the selected protocols.

In one example, the apparatus 2500 includes a processor 2516 and a serial interface 2514 configured to couple the apparatus to the multi-wire serial link 2512 that has a first line configured to carry a clock signal and a second line configured to carry a data signal. The processor 2516 may be configured to configure the serial interface 2514 for a point-to-point mode of operation, and transmit a first two-bit command through the serial interface 2514. The two-bit command may include a one-bit address and a read/write bit. The processor 2516 may be further configured to initiate a transaction through the serial interface 2514. The transaction is identified by the two-bit command and may be conducted in accordance with an I3C protocol. In one example, the transaction includes a transfer of one or more data frames formatted in accordance with the I3C protocol.

In some instances, the apparatus 2500 may be operated as a master device and the processor 2516 may be further configured to transmit an I3C CCC after transmitting the two-bit command when the one-bit address has a first value, and conduct a private transaction when the one-bit address has a second value. The read/write bit may select between a private read transaction and a private write transaction. A slave device may transmit an acknowledgement in response to the first two-bit command.

In some instances, the apparatus 2500 may be operated as a master device and the processor 2516 may be further configured to initiate transmission of a second two-bit command through the serial interface 2514 after the transaction has been completed, and initiate an in-band interrupt service procedure when the data line is driven by a slave device before completion of transmission of the second two-bit command. The processor 2516 may be further configured to transfer control of the serial interface 2514 to a slave device after completion of the interrupt service procedure.

In some instances, the apparatus 2500 may be operated as a master device and the processor 2516 may be further configured to identify a slave device coupled to the serial interface 2514, determine that no other device is actively coupled to the serial interface 2514, and configure one or more registers of the slave device to cause slave device to enter the point-to-point mode of operation. The processor 2516 may be further configured to transmit a reset pattern through the serial interface 2514, the reset pattern being configured to cause the slave device to exit the point-to-point mode of operation.

In some instances, the apparatus 2500 may be operated as a slave device and the processor 2516 may be further configured to receive an I3C CCC after receiving the two-bit command when the one-bit address has a first value, and participate in a private transaction when the one-bit address has a first value. The read/write bit may select between a private read transaction and a private write transaction.

In some instances, the apparatus 2500 may be operated as a slave device and the processor 2516 may be further configured to detect a START condition on the serial interface 2514 after the transaction has been completed, and drive a data line of the serial interface 2514 to request an in-band interrupt service procedure. The processor 2516 may be further configured to obtain control of the serial interface after completion of the interrupt service procedure.

In some instances, the apparatus 2500 may be operated as a slave device and the processor 2516 may be further configured to detect a reset pattern in a signal received from the serial interface 2514, and exit the point-to-point mode of operation in response to the reset pattern.

In another example, the processor-readable storage medium 2518 may store, maintain or otherwise include code which, when executed by the processor 2516, causes the processor 2516 to configure a serial interface 2514 for a point-to-point mode of operation, transmit a first two-bit command through the serial interface 2514, the two-bit command including a one-bit address and a read/write bit, and initiate a transaction through the serial interface 2514. The transaction is identified by the two-bit command and is conducted in accordance with an I3C protocol. The transaction may include one or more data frames formatted in accordance with the I3C protocol. An acknowledgement may be provided by a slave device in response to the first two-bit command.

The processor-readable storage medium 2518 may include code that causes a master device to transmit an I3C CCC after transmitting the two-bit command when the one-bit address has a first value, and conduct a private transaction when the one-bit address has a second value. The read/write bit may select between a private read transaction and a private write transaction. The processor-readable storage medium 2518 may include code that causes a slave device to receive the I3C CCC after transmitting the two-bit command when the one-bit address has the first value, and participate in the private transaction when the one-bit address has the second value. The read/write bit may select between a private read transaction and a private write transaction.

The processor-readable storage medium 2518 may include code that causes a master device to initiate transmission of a second two-bit command through the serial interface 2514 after the transaction has been completed, and initiate an in-band interrupt service procedure when a data line of the serial interface 2514 is driven by a slave device before completion of transmission of the second two-bit command. A master device may transfer control of the serial interface 2514 to a slave device after completion of the interrupt service procedure.

The processor-readable storage medium 2518 may include code that causes a master device to detect a START condition on the serial interface 2514 after the transaction has been completed, and drive a data line of the serial interface 2514 to request an in-band interrupt service procedure. The slave device may obtain control of the serial interface 2514 after completion of the interrupt service procedure.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for data communication performed at a master device, comprising:
   identifying a slave device coupled to the master device through a serial interface;
   determining that no other device is actively coupled to the master device through the serial interface;
   configuring one or more registers of the slave device to cause the slave device to enter a point-to-point mode of operation;
   configuring the serial interface for the point-to-point mode of operation;
   transmitting a first command through the serial interface, wherein the first command corresponds to an Improved Inter-Integrated Circuit (I3C) command in which a slave address is truncated to a single address bit, and wherein the first command includes a read/write bit;
   initiating a transaction through the serial interface, wherein the transaction is identified as a read or write transaction by the first command and is conducted in accordance with an I3C protocol; and
   transmitting a reset pattern through the serial interface, the reset pattern being configured to cause the slave device to exit the point-to-point mode of operation.

2. The method of claim 1, wherein the transaction comprises one or more data frames formatted in accordance with the I3C protocol.

3. The method of claim 1, further comprising:
   transmitting a second command when the serial interface is configured for the point-to-point mode of operation, including:
      transmitting a first address bit of an I3C Common Command Code;
      refraining from transmitting all remaining bits of the I3C Common Command Code when the first address bit has a first value;
      transmitting all remaining bits of the I3C Common Command Code when the first address bit has a second value;
      transmitting a second read/write bit; and
      conducting a private transaction when the first address bit has the first value, the second read/write bit selecting between a private read transaction and a private write transaction.

4. The method of claim 1, further comprising:
   receiving an acknowledgement from the slave device in response to the first command.

5. The method of claim 1, further comprising:
   initiating transmission of a third command through the serial interface, wherein the third command includes a truncated slave address field comprising a single bit; and
   initiating an in-band interrupt service procedure when a data line of the serial interface is driven by the slave device before completion of transmission of the single bit in the truncated slave address field.

6. The method of claim 5, further comprising:
   transferring control of the serial interface to the slave device after completion of the in-band interrupt service procedure.

7. An apparatus for data communication, comprising:
   a serial interface having a clock line and a data line; and
   a processor configured to:
      identify a slave device coupled to the apparatus through the serial interface;
      determine that no other device is actively coupled to the apparatus through the serial interface;
      configure one or more registers of the slave device to cause the slave device to enter a point-to-point mode of operation;
      configure the serial interface for the point-to-point mode of operation;
      transmit a first command through the serial interface, wherein the first command corresponds to an Improved Inter-Integrated Circuit (I3C) command in which a slave address is truncated to a single address bit, and wherein the first command includes a read/write bit;
      initiate a transaction through the serial interface, wherein the transaction is identified as a read or write transaction by the first command and is conducted in accordance with an I3C protocol; and
      transmit a reset pattern through the serial interface, the reset pattern being configured to cause the slave device to exit the point-to-point mode of operation.

8. The apparatus of claim 7, wherein the transaction comprises one or more data frames formatted in accordance with the I3C protocol.

9. The apparatus of claim 7, wherein the processor is further configured to:
   transmit a second command when the serial interface is configured for the point-to-point mode of operation, by:
      transmitting a first address bit of an I3C Common Command Code;
      refraining from transmitting all remaining bits of the I3C Common Command Code when the first address bit has a first value;
      transmitting all remaining bits of the I3C Common Command Code when the first address bit has a second value;
      transmitting a second read/write bit; and
      conducting a private transaction when the first address bit has the first value, the second read/write bit selecting between a private read transaction and a private write transaction.

10. The apparatus of claim 7, wherein the processor is further configured to:

receive an acknowledgement from the slave device in response to the first command.

11. The apparatus of claim 7, wherein the processor is further configured to:
   initiate transmission of a third command through the serial interface, wherein the third command includes a truncated slave address field comprising a single bit; and
   initiate an in-band interrupt service procedure when the data line is driven by the slave device before completion of transmission of the single bit in the truncated slave address field.

12. The apparatus of claim 11, wherein the processor is further configured to:
   transfer control of the serial interface to the slave device after completion of the in-band interrupt service procedure.

13. A method for data communication performed at a slave device, comprising:
   configuring a serial interface for a point-to-point mode of operation;
   receiving a first command through the serial interface, wherein the first command corresponds to an Improved Inter-Integrated Circuit (I3C) command in which a slave address is truncated to a single address bit, and wherein the first command includes a read/write bit; and
   participating in a first transaction conducted through the serial interface, wherein the first transaction is identified as a read or write transaction by the first command and is conducted in accordance with an I3C protocol; and
   receiving a second command when the serial interface is configured for the point-to-point mode of operation, including:
      receiving only a first address bit of an I3C Common Command Code when the first address bit has a first value;
      receiving a plurality of additional address bits in the I3C Common Command Code when the first address bit has a second value; and
      participating in a private transaction when the first address bit has the first value, wherein a second read/write bit transmitted after the first address bit selects between a private read transaction and a private write transaction.

14. The method of claim 13, wherein the first transaction comprises one or more data frames formatted in accordance with the I3C protocol.

15. The method of claim 13, further comprising:
   transmitting an acknowledgement in response to the first command.

16. The method of claim 13, further comprising:
   detecting a START condition on the serial interface after the first transaction has been completed; and
   driving a data line of the serial interface to request an in-band interrupt service procedure.

17. The method of claim 16, further comprising:
   obtaining control of the serial interface after completion of the in-band interrupt service procedure.

18. The method of claim 13, further comprising:
   detecting a reset pattern in a signal received from the serial interface; and
   exiting the point-to-point mode of operation in response to the reset pattern.

19. An apparatus for data communication, comprising:
   a serial interface having a clock line and a data line; and
   a processor configured to:
      configure the serial interface for a point-to-point mode of operation;
      receive a first command through the serial interface, wherein the first command corresponds to an Improved Inter-Integrated Circuit (I3C) command in which a slave address is truncated to a single address bit, and wherein the first command includes a read/write bit;
      participate in a first transaction conducted through the serial interface, wherein the first transaction is identified as a read or write transaction by the first command and is conducted in accordance with an I3C protocol; and
   receive a second command when the serial interface is configured for the point-to-point mode of operation, by receiving only a first address bit of an I3C Common Command Code when the first address bit has a first value, receiving a plurality of additional address bits in the I3C Common Command Code when the first address bit has a second value, and participating in a private transaction when the first address bit has the first value, wherein a second read/write bit transmitted after the first address bit selects between a private read transaction and a private write transaction.

20. The apparatus of claim 19, wherein the first transaction comprises one or more data frames formatted in accordance with the I3C protocol.

21. The apparatus of claim 19, wherein the processor is further configured to:
   transmit an acknowledgement in response to the first command.

22. The apparatus of claim 19, wherein the processor is further configured to:
   detect a START condition on the serial interface after the first transaction has been completed; and
   drive the data line of the serial interface to request an in-band interrupt service procedure.

23. The apparatus of claim 22, wherein the processor is further configured to:
   obtain control of the serial interface after completion of the in-band interrupt service procedure.

24. The apparatus of claim 19, wherein the processor is further configured to:
   detect a reset pattern in a signal received from the serial interface; and
   exit the point-to-point mode of operation in response to the reset pattern.

* * * * *